(12) United States Patent
Wakabayashi et al.

(10) Patent No.: US 11,027,361 B2
(45) Date of Patent: Jun. 8, 2021

(54) SPOT-WELDED JOINT AND SPOT WELDING METHOD

(71) Applicant: NIPPON STEEL & SUMITOMO METAL CORPORATION, Tokyo (JP)

(72) Inventors: Chisato Wakabayashi, Tokyo (JP); Fuminori Watanabe, Tokyo (JP); Seiji Furusako, Tokyo (JP); Yasunobu Miyazaki, Tokyo (JP); Hiroyuki Kawata, Tokyo (JP); Tohru Okada, Tokyo (JP); Hideki Hamatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 447 days.

(21) Appl. No.: 16/145,696

(22) Filed: Sep. 28, 2018

(65) Prior Publication Data

US 2019/0030637 A1 Jan. 31, 2019

Related U.S. Application Data

(62) Division of application No. 14/889,111, filed as application No. PCT/JP2014/064616 on Jun. 2, 2014, now abandoned.

(30) Foreign Application Priority Data

Jun. 5, 2013 (JP) .................................. 2013-118886

(51) Int. Cl.
*B23K 11/11* (2006.01)
*B23K 11/16* (2006.01)
*B23K 103/04* (2006.01)

(52) U.S. Cl.
CPC ............. *B23K 11/115* (2013.01); *B23K 11/16* (2013.01); *B23K 2103/04* (2018.08)

(58) Field of Classification Search
CPC ... B23K 11/115; B23K 11/16; B23K 2103/04; B23K 11/24
(Continued)

(56) References Cited

U.S. PATENT DOCUMENTS 4,072,843 A * 2/1978 Szabo .................. B23K 11/163
219/91.1
4,414,455 A * 11/1983 Schneider .............. B23K 11/24
219/64

(Continued)

FOREIGN PATENT DOCUMENTS

CN 102581459 A 7/2012
EP 2 460 613 A1 6/2012
(Continued)

OTHER PUBLICATIONS

Extended European Search Report, dated Nov. 15, 2016, for European Application No. 14807362.0.
(Continued)

*Primary Examiner* — Jimmy Chou
(74) *Attorney, Agent, or Firm* — Birch, Stewart, Kolasch & Birch, LLP

(57) ABSTRACT

By obtaining a spot-welded joint being a spot-welded joint formed by overlapping a plurality of pieces of steel plates (1A, 1B) and performing spot welding on the steel plates, including a high-strength steel plate whose tensile strength is 750 (MPa) to 2500 (MPa), being at least one piece of steel plate out of the plurality of pieces of steel plates, in which a carbon equivalent Ceq of the high-strength steel plate is 0.20 mass % to 0.55 mass %, and ten or more of iron-based carbides in each of which a length of a longest portion is 0.1 (μm) or more exist in a square region 103 within a heat-affected zone 4 of a cross section that passes through a center of a welding mark, and is cut along a plate thickness (Continued)

direction of the steel plates (1A, 1B), a cross tensile strength of the spot-welded joint to be formed is improved.

1 Claim, 10 Drawing Sheets

(58) Field of Classification Search
USPC .................................................. 219/86.31
See application file for complete search history.

(56) References Cited

U.S. PATENT DOCUMENTS

| | | | | |
|---|---|---|---|---|
| 5,194,709 | A * | 3/1993 | Ichikawa | B23K 11/253 219/109 |
| 8,502,105 | B2 * | 8/2013 | Tanaka | C09J 5/10 219/86.22 |
| 9,969,026 | B2 * | 5/2018 | Sigler | B23K 11/185 |
| 10,179,371 | B2 * | 1/2019 | Chergui | B23K 11/0026 |
| 10,583,516 | B2 * | 3/2020 | Chergui | B23K 11/11 |
| 10,730,134 | B2 * | 8/2020 | Furusako | B23K 11/115 |
| 2008/0241572 | A1 * | 10/2008 | Miyamoto | B23K 11/20 428/600 |
| 2010/0072176 | A1 * | 3/2010 | Numano | B23K 11/115 219/108 |
| 2011/0008648 | A1 * | 1/2011 | Okitsu | C22C 38/001 428/683 |
| 2011/0097594 | A1 * | 4/2011 | Tanaka | B23K 11/24 428/594 |
| 2011/0180518 | A1 * | 7/2011 | Hasegawa | B23K 11/115 219/108 |
| 2011/0253681 | A1 * | 10/2011 | Wang | B23K 11/257 219/108 |
| 2011/0272384 | A1 * | 11/2011 | Matsushita | B23K 11/115 219/91.2 |
| 2012/0129006 | A1 * | 5/2012 | Kanai | C22C 38/00 428/683 |
| 2012/0141829 | A1 * | 6/2012 | Oikawa | B32B 15/011 428/683 |
| 2013/0020288 | A1 * | 1/2013 | Moision | B23K 11/24 219/108 |
| 2014/0305912 | A1 * | 10/2014 | Taniguchi | B23K 11/115 219/91.22 |
| 2014/0308070 | A1 * | 10/2014 | Taniguchi | B23K 11/16 403/271 |
| 2014/0367368 | A1 * | 12/2014 | Yang | B23K 11/115 219/91.22 |
| 2015/0001188 | A1 * | 1/2015 | Oikawa | C22C 38/001 219/91.22 |
| 2015/0053655 | A1 * | 2/2015 | Sigler | B23K 11/115 219/91.22 |
| 2015/0174690 | A1 * | 6/2015 | Furusako | B23K 11/115 219/91.22 |
| 2016/0082543 | A1 * | 3/2016 | Wakabayashi | B23K 11/115 219/86.31 |
| 2016/0184919 | A1 * | 6/2016 | Chergui | B23K 11/115 219/91.21 |
| 2016/0288241 | A1 * | 10/2016 | Chergui | B23K 11/11 |

FOREIGN PATENT DOCUMENTS

| | | |
|---|---|---|
| JP | 2002-103048 A | 4/2002 |
| JP | 2009-125801 A | 6/2009 |
| JP | 2009-241086 A | 10/2009 |
| JP | 2010-59451 A | 3/2010 |
| JP | 2010-115706 A | 5/2010 |
| JP | 2011-5544 A | 1/2011 |
| JP | 2011-177794 A | 9/2011 |
| JP | 2012-192455 A | 10/2012 |
| MX | 2012002346 A | 3/2012 |
| WO | WO 2011-025015 A1 | 3/2011 |

OTHER PUBLICATIONS

International Preliminary Report on Patentability and English translation of the Written Opinion of the International Searching Authority (PCT/IB/338, PCT/IB/373 and PCT/ISA/237) dated Dec. 17, 2015 for Application No. PCT/JP2014/064616.
International Search Report, issued in PCT/JP2014/064616, dated Aug. 26, 2014.
Taiwanese Office Action dated Feb. 2, 2016, issued in corresponding Taiwanese Patent Application No. 103119395.
Written Opinion of the International Searching Authority, issued in PCT/JP2014/064616, dated Aug. 26, 2014.
Final Office Action, dated Jul. 9, 2018 issued in U.S. Appl. No. 14/889,111.
Non-Final Office Action, dated Jan. 12, 2018 issued in U.S. Appl. No. 14/889,111.
Restriction Requirement, dated Aug. 24, 2017 issued in U.S. Appl. No. 14/889,111.
Mexican Office Action for corresponding Mexican Application No. MX/a/2015/015832, dated Feb. 24, 2020, with English translation.

* cited by examiner

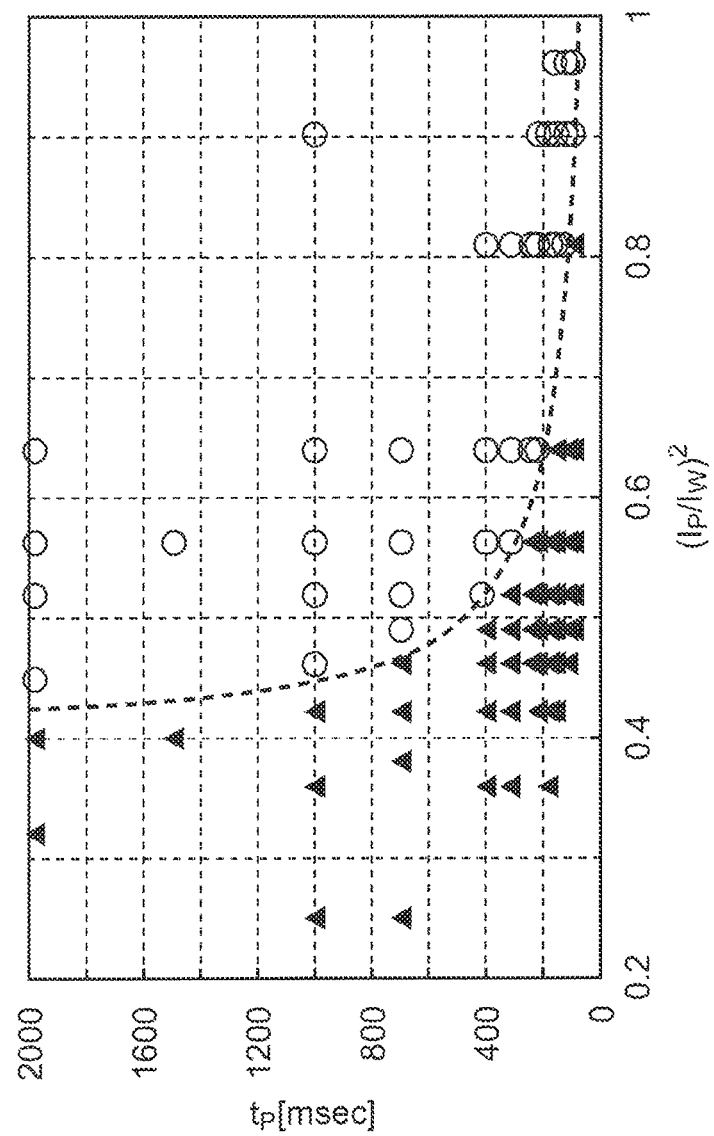

SPOT-WELDED JOINT AND SPOT WELDING METHOD

This application is a Divisional of U.S. application Ser. No. 14/889,111, filed Nov. 4, 2015, which is the U.S. National Phase of PCT/JP2014/064616, filed Jun. 2, 2014, which claims priority under 35 U.S.C. 119(a) to Japanese Patent Application No. 2013-118886, filed Jun. 5, 2013, the contents of all of which are incorporated by reference, in their entirety, into the present application.

TECHNICAL FIELD

The present invention relates to a joint formed by overlapping a plurality of pieces of steel plates and performing spot welding on the steel plates.

BACKGROUND ART

In recent years, a reduction in weight of a vehicle body has been demanded for achieving a fuel efficiency and a $CO_2$ emission reduction in an automobile field. Further, in order to improve a collision safety, it has been demanded to increase a strength of members of a vehicle body. In order to fulfill these demands, it is effective to use a high-strength steel plate for a vehicle body, components and the like. When performing assembling of a vehicle body, mounting of a component, and the like, spot welding is mainly used. When a plurality of pieces of steel plates including at least one piece of steel plate whose tensile strength is 750 MPa or more are spot-welded, a strength of a welded joint becomes a problem.

In a joint formed by overlapping a plurality of pieces of steel plates and performing spot welding on the steel plates (hereinafter, referred to also as "spot-welded joint"), a tensile strength is an important property. Such a tensile strength includes a tensile shear strength (TSS) measured under a tensile load applied in a shear direction, and a cross tensile strength (CTS) measured under a tensile load applied in a peeling direction. Note that measuring methods for the tensile shear strength and the cross tensile strength are defined in JIS Z 3136 and JIS Z 3137.

The CTS in a spot-welded joint formed of a plurality of pieces of steel plates each having a tensile strength of 270 MPa to 600 MPa increases, in accordance with an increase in strength of the steel plates. Therefore, a problem regarding a joint strength is difficult to occur, in the spot-welded joint formed of the steel plates each having the tensile strength of 270 MPa to 600 MPa. However, the CTS in a spot-welded joint formed of a plurality of pieces of steel plates including at least one piece of steel plate whose tensile strength is 750 MPa or more, does not increase or reduces even if the tensile strength of the steel plates increases.

Generally, in a spot-welded joint formed of a plurality of pieces of steel plates including at least one piece of steel plate whose tensile strength is 750 MPa or more, the CTS is easily reduced. This is because a stress concentration with respect to a welded portion is increased due to a lowering of ductility, and because a toughness of the welded portion is lowered since the welded portion is tempered. For this reason, an improvement of the CTS in the spot-welded joint formed of the plurality of pieces of steel plates including at least one piece of steel plate whose tensile strength is 750 MPa or more is demanded.

As a method of securing the strength and the toughness in the spot-welded joint formed of the plurality of pieces of steel plates including at least one piece of steel plate whose tensile strength is 750 MPa or more, there is a two-stage energization method in which main energization is conducted, and then post-energization is conducted.

Patent Literature 1 describes a method in which main energization is finished and after a predetermined time passes, tempering energization is conducted, to thereby perform annealing on a spot-welded joint (a nugget portion and a heat-affected zone) to reduce a hardness of the joint.

However, in this method, there is a need to cause a martensite transformation to be almost completed before performing the tempering energization. Accordingly, a long cooling time becomes required after the main energization is finished. Further, in this method, the nugget is softened to reduce a shear force.

Further, as a method of securing the strength and the toughness in the spot-welded joint formed of the plurality of pieces of steel plates including at least one piece of steel plate whose tensile strength is 750 MPa or more, there is a method in which welding is performed, and a welded portion is then heated by a way of heating different from the welding. Patent Literature 2 describes a method in which welding is performed, and after that, a welded portion is heated with high frequency to be subjected to tempering treatment.

However, in this method, another process is required after the welding, and thus an operating procedure becomes complicated. Further, in this method, a special apparatus for using the high frequency is required. Furthermore, in this method, a nugget is softened to reduce a shear force.

Further, Patent Literature 3 describes a method in which a nugget is formed through main welding, and then post-energization is performed with a current which is equal to or greater than a main welding current.

However, in this method, when a post-energization time is lengthened, a nugget diameter is only enlarged, and a structure becomes the same as that obtained in conventional welding.

Patent Literature 4 describes a method in which spot welding is performed on steel plates each having a tensile strength of 440 MPa or more. In this method, a composition of components of the steel plate is restricted to satisfy the following conditions: C×P≤0.0025; P: 0.015% or less; and S: 0.01% or less. Further, after performing the welding, heat treatment is performed on a welded portion at 300° C. for about 20 minutes.

However, in this method, the applicable steel plate is limited. In addition, in this method, it takes a long time to perform the welding, and thus the productivity is low.

Patent Literature 5 describes a spot-welded joint formed of high-strength steel plates (tensile strength: 750 to 1850 MPa, carbon equivalent Ceq: 0.22 to 0.55 mass %) in which a microstructure of a nugget outer layer zone, and an average grain diameter and a number density of carbides in the microstructure are defined.

However, when a fracture occurs on the outside of the nugget, the structure of the nugget makes no contribution, and thus the definition related to the microstructure has no meaning.

Patent Literature 6 describes a method in which spot welding is performed on steel plates each having a tensile strength of 900 to 1850 MPa, and having a plate thickness of 1.8 to 2.8 mm. In this method, after performing the welding, post-energization is successively performed with a current which is 0.5 times to 0.9 times a welding current, for a time which is 0.3 times to 0.5 times a welding time.

However, in this method, a study regarding the time between the main welding and the post-energization has not been sufficiently conducted, and thus the method does not contribute to the improvement of the joint strength.

CITATION LIST

Patent Literature

Patent Literature 1: Japanese Laid-open Patent Publication No. 2002-103048
Patent Literature 2: Japanese Laid-open Patent Publication No. 2009-125801
Patent Literature 3: Japanese Laid-open Patent Publication No. 2010-115706
Patent Literature 4: Japanese Laid-open Patent Publication No. 2010-059451
Patent Literature 5: International Publication Pamphlet No. WO 2011-025015
Patent Literature 6: Japanese Laid-open Patent Publication No. 2011-5544

SUMMARY OF INVENTION

Technical Problem

From the backgrounds as described above, in a spot-welded joint formed of a plurality of pieces of steel plates including at least one piece of steel plate whose tensile strength is 750 MPa to 2500 MPa, the toughness becomes easily insufficient, and thus it has been conventionally difficult to secure a sufficiently high cross tensile strength.

Accordingly, the present invention has an object to improve a cross tensile strength of a spot-welded joint formed of a plurality of pieces of steel plates including at least one piece of steel plate whose tensile strength is 750 MPa to 2500 MPa.

Solution to Problem

A spot-welded joint of the present invention is a spot-welded joint formed by overlapping a plurality of pieces of steel plates and performing spot welding on the steel plates, including a high-strength steel plate whose tensile strength is 750 MPa to 2500 MPa, being at least one piece of steel plate out of the plurality of pieces of steel plates, in which a carbon equivalent Ceq of the high-strength steel plate represented by the following expression (A) is 0.20 mass % to 0.55 mass %, and ten or more of iron-based carbides in each of which a length of a longest portion is 0.1 (m) or more exist in a square region whose length of one side is 10 (μm) in which a plate thickness direction and a plate surface direction of the steel plates are set to a vertical direction and a horizontal direction, respectively, being a region within a heat-affected zone of a cross section that passes through a center of a welding mark formed on surfaces of the steel plates by the spot welding, and is cut along the plate thickness direction of the steel plates, in which a position of a center of the square region is a position, at the cross section, separated by 100 (μm) from a position of an end portion of a nugget in a direction perpendicular to a tangent to a line indicating the end portion of the nugget, at that position, in which the position of the end portion of the nugget is a position, out of positions on the line indicating the end portion of the nugget, within a range whose center is set to a center in the plate thickness direction of the spot-welded joint and having a length of ¼ times a total plate thickness being a total value of plate thicknesses of the plurality of pieces of steel plates along the plate thickness direction.

$$Ceq=[C]+[Si]/30+[Mn]/20+2[P]+4[S] \quad (A)$$

[C], [Si], [Mn], [P], and [S] in the above expression (A) indicate respective contents (mass %) of C, Si, Mn, P, and S.

A first example of a spot welding method of the present invention is a spot welding method of overlapping a plurality of pieces of steel plates and performing spot welding on the steel plates, in which at least one piece of steel plate out of the plurality of pieces of steel plates is a high-strength steel plate whose tensile strength is 750 MPa to 2500 MPa, in which a carbon equivalent Ceq of the high-strength steel plate represented by the following expression (A) is 0.20 mass % to 0.55 mass %, the spot welding method including: performing main welding of energizing welding electrodes with a main welding current $I_W$ (kA) in a state where the overlapped plurality of pieces of steel plates are pressurized by the welding electrodes at a pressurizing force $F_E$ (N) satisfying the following expression (B); performing, after the main welding is finished, cooling after main welding of cooling the plurality of pieces of steel plates for a cooling time after main welding $t_S$ (msec) satisfying the following expression (C) while retaining the pressurizing force $F_E$ (N) satisfying the following expression (B); performing, after the cooling after main welding is finished, post-energization of energizing the welding electrodes with a post-energization current $I_P$ (kA) satisfying the following expression (D) for a post-energization time $t_P$ (msec) satisfying the following expression (E) while retaining the pressurizing force $F_E$ (N) satisfying the following expression (B); and retaining, after the post-energization is finished, the pressurizing force $F_E$ (N) satisfying the above expression (B) for a retention time $t_H$ (msec) satisfying the following expression (F), and then releasing the pressurizing at the pressurizing force $F_E$ (N).

$$Ceq=[C]+[Si]/30+[Mn]/20+2[P]+4[S] \quad (A)$$

$$1960 \times h \leq F_E \leq 3920 \times h \quad (B)$$

$$7 \times h+5 \leq t_S \leq 300 \quad (C)$$

$$0.66 \times I_W \leq I_P < I_W \quad (D)$$

$$48/\{(I_P/I_W)^2-0.44\} \leq t_P \quad (E)$$

$$0 \leq t_H \leq 300 \quad (F)$$

[C], [Si], [Mn], [P], and [S] in the above expression (A) indicate respective contents (mass %) of C, Si, Mn, P, and S, and h in the above expression (B), and the above expression (C) indicates a plate thickness of the steel plate (mm).

A second example of a spot welding method of the present invention is a spot welding method of overlapping a plurality of pieces of steel plates and performing spot welding on the steel plates, in which at least one piece of steel plate out of the plurality of pieces of steel plates is a high-strength steel plate whose tensile strength is 750 MPa to 2500 MPa, in which a carbon equivalent Ceq of the high-strength steel plate represented by the following expression (A) is 0.20 mass % to 0.55 mass %, the spot welding method including: performing pre-energization of energizing welding electrodes with a pre-energization current $I_f$ (kA) satisfying the following expression (C) for a pre-energization time $t_f$ (msec) satisfying the following expression (D), in a state where the overlapped plurality of pieces of steel plates are pressurized by the welding electrodes at a pressurizing force $F_E$ (N) satisfying the following expression (B); performing, after the pre-energization is finished, cooling after pre-energization of cooling the plurality of pieces of steel plates for a cooling time after pre-energization $t_C$ (msec) satisfying the following expression (E) while retaining the pressurizing force $F_E$ (N) satisfying the following expression (B); performing, after the cooling after pre-energization is finished, main welding of energizing the welding electrodes with a main welding current $I_W$ (kA) while retaining the pressurizing force $F_E$ (N) satisfying the following expression (B); performing, after the main welding is finished, cooling after main welding of cooling the plurality of pieces of steel plates for a cooling time after main welding $t_S$ (msec) satisfying the following expression (F) while retaining the pressurizing force $F_E$ (N) satisfying the following expression (B); performing, after the cooling after main welding is finished, post-energization of energizing the welding electrodes with a post-energization current $I_P$ (kA) satisfying the following expression (G) for a post-energization time $t_P$ (msec) satisfying the following expression (H) while retaining the pressurizing force $F_E$ (N) satisfying the following expression (B); and retaining, after the post-energization is finished, the pressurizing force $F_E$ (N) satisfying the above expression (B) for a retention time $t_H$ (msec) satisfying the following expression (I), and then releasing the pressurizing at the pressurizing force $F_E$ (N).

$$Ceq=[C]+[Si]/30+[Mn]/20+2[P]+4[S] \quad (A)$$

$$1960 \times h < F_E \leq 3920 \times h \quad (B)$$

$$0.40 \times I_W \leq I_f < I_W \quad (C)$$

$$20 \leq t_f \quad (D)$$

$$0 \leq t_C < 200 + 7 \times h \quad (E)$$

$$7 \times h + 5 \leq t_S \leq 300 \quad (F)$$

$$0.66 \times I_W \leq I_P < I_W \quad (G)$$

$$48/\{(I_P/I_W)^2 - 0.4\} \leq t_P \quad (H)$$

$$0 \leq t_H \leq 300 \quad (I)$$

[C], [Si], [Mn], [P], and [S] in the above expression (A) indicate respective contents (mass %) of C, Si, Mn, P, and S, and h in the above expression (B), the above expression (E), and the above expression (F) indicates a plate thickness of the steel plate (mm).

Advantageous Effects of Invention

According to the present invention, it is possible to improve a cross tensile strength of a spot-welded joint formed of a plurality of pieces of steel plates including at least one piece of steel plate whose tensile strength is 750 MPa to 2500 MPa.

BRIEF DESCRIPTION OF DRAWINGS

FIG. 10 is a diagram illustrating a second example of a relationship between a post-energization time and a square of a value obtained by dividing a post-energization current by a main welding current.

DESCRIPTION OF EMBODIMENTS

Figure 1:
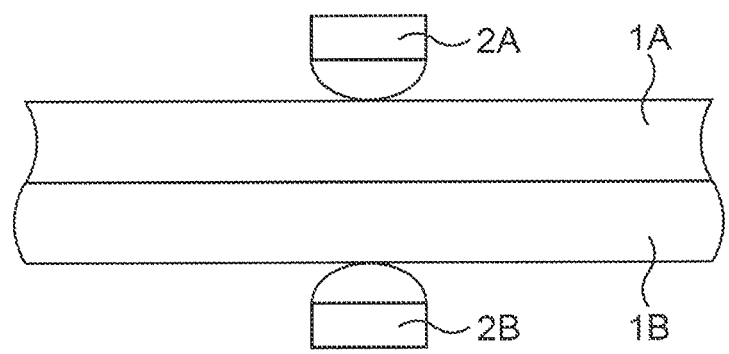
FIG. 1 is a diagram illustrating one example of an arrangement of two pieces of steel plates and welding electrodes when spot welding is started.

The present inventors conducted earnest studies, from a metallurgical point of view and a mechanical point of view, regarding the reason why the cross tensile strength (CTS) in the spot-welded joint formed of the plurality of pieces of steel plates including at least one piece of steel plate whose tensile strength is 750 MPa to 2500 MPa cannot be sufficiently improved by the conventional technique in which the post-energization is performed after the main welding. Note that in the following description, the steel plate whose tensile strength is 750 MPa to 2500 MPa is referred to as "high-strength steel plate" according to need.

As a result of this, it was proved that if the toughness in the nugget is only improved as in the above-described conventional techniques, when performing a cross tensile test, although it is possible to suppress a fracture under low load which occurs inside the nugget, a fracture under low load which occurs in the heat-affected zone (HAZ) in the periphery of the nugget cannot be sufficiently suppressed.

Here, the nugget indicates a part of a steel plate which is melted through energization between welding electrodes and then is solidified. The heat-affected zone indicates a part of a steel plate heated to a temperature equal to or more than the Ac1 point and less than a melting temperature.

As described above, the present inventors found out that, in order to obtain a spot-welded joint with high reliability, it is necessary to improve not only the fracture load inside the nugget but also the fracture load in the peripheral portion of the nugget. In order to achieve that, in the present embodiment, after a solidified region is formed in an inner periphery of a molten zone, the solidified region and a heat-affected zone surrounding the solidified region are retained at a high temperature for a long time.

Hereinafter, embodiments of the present invention will be described. Basically, the respective embodiments to be described below are realized by retaining a solidified region formed in an inner periphery of a molten zone and a heat-affected zone surrounding the solidified region at a high temperature for a long time. However, it is not possible to obtain a welded joint with high reliability only by performing the retention for a long time which exceeds a conventional retention time.

[High-Strength Steel Plate]

First, steel plates used for spot welding will be described.

(Steel Type)

A steel type is not particularly limited. The steel type can employ any type such as, for example, a two-phase structure type (for example, a structure containing martensite in ferrite, or a structure containing bainite in ferrite), a strain-induced transformation type (a structure containing residual austenite in ferrite), a hardened type (a martensite structure), or a microcrystalline type (a structure essentially made of ferrite).

In the present embodiment, a spot-welded joint using the high-strength steel plate constituted by whichever steel type, can suppress "reduction and fluctuation" of joint strength to realize a good fracture appearance, so that it is possible to obtain a welded joint with high reliability.

Note that a steel type of a steel plate to be overlapped with the high-strength steel plate, is not particularly limited as well. A steel plate of a steel type different from the steel type of the high-strength steel plate can also be employed. For example, the steel plate to be overlapped with the high-strength steel plate can also be set to a mild steel plate. Further, the steel plate to be overlapped with the high-strength steel plate can also be a steel plate of a steel type which is the same as the steel type of the high-strength steel plate.

(Tensile Strength)

A tensile strength of at least one piece of steel plate (high-strength steel plate) out of a plurality of pieces of overlapped steel plates is set to 750 MPa to 2500 MPa. Normally, as a tensile strength of a high-strength steel plate increases, a high joint strength is required. Although a cross tensile strength (CTS) of a spot-welded joint increases in proportion to a strength of a steel plate in the class of 590 MPa to 780 MPa, it decreases in a steel plate having a strength of 780 MPa or more.

If the tensile strength of the high-strength steel plate is less than 750 MPa, the cross tensile strength is high from the beginning, and further, a load with respect to the spot-welded joint is small. Accordingly, a problem regarding a deterioration of fracture appearance in a welded portion and the joint strength is hard to occur. Therefore, the tensile strength of the high-strength steel plate is set to 750 MPa or more.

If the tensile strength of the high-strength steel plate exceeds 2500 MPa, the suppression of "reduction and fluctuation" of the joint strength becomes difficult. Further, in accordance with this, it becomes difficult to suppress the deterioration of the fracture appearance in the welded portion, and to suppress an occurrence of a defect or a crack inside the nugget. Therefore, the tensile strength of the high-strength steel plate is set to 2500 MPa or less.

Note that a tensile strength of a steel plate to be overlapped with the high-strength steel plate is not particularly limited as well. The steel plate to be overlapped with the high-strength steel plate can also be set to a high-strength steel plate whose tensile strength is 750 MPa to 2500 MPa, and it can also be set to a steel plate whose tensile strength is less than 750 MPa. For example, if the steel plate is a steel member used in the automobile field and the like, the tensile strength thereof may be selected in accordance with the steel member to be used.

(Plate Thickness)

A plate thickness of the high-strength steel plate is not particularly limited. For example, a plate thickness (0.5 mm to 3.2 mm) of a high-strength steel plate used in general for a vehicle body or the like of an automobile suffices. However, since a stress concentration in a periphery of a nugget increases in accordance with an increase in a plate thickness of a high-strength steel plate, the plate thickness of the high-strength steel plate is preferably 2.6 mm or less.

A plate thickness of a steel plate to be overlapped with the high-strength steel plate is not particularly limited. It is also possible that plate thicknesses of a plurality of pieces of steel plates to be overlapped are mutually different. For example, when three pieces or more of steel plates are overlapped, plate thicknesses of the respective three pieces or more of steel plates may also be different from one another. It is only required that at least one piece of steel plate out of the three pieces or more of steel plates is the high-strength steel plate, and the other steel plates may also be mild steel plates. Further, when three pieces or more of steel plates are overlapped, plate thicknesses of at least two pieces of steel plates may also be the same. Note that generally, a thickness of a steel plate is 6 mm or less.

(Carbon Equivalent Ceq)

A carbon equivalent Ceq of the high-strength steel plate represented by the following expression (1) is preferably within a range of 0.20 mass % to 0.55 mass %. If the carbon equivalent Ceq is less than 0.20 mass %, it is not possible to obtain a tensile strength of equal to or more than 750 MPa, which is the lower limit value of the tensile strength of the high-strength steel plate described above. On the other hand, it is not preferable that the carbon equivalent Ceq exceeds 0.55 mass %, since the tensile strength exceeds 2500 MPa, which is the upper limit value of the tensile strength of the high-strength steel plate described above. The Ceq of a steel plate to be overlapped with the high-strength steel plate can take any value.

$$Ceq=[C]+[Si]/30+[Mn]/20+2[P]+4[S] \quad (1)$$

[C], [Si], [Mn], [P], and [S] indicate respective contents (mass %) of C, Si, Mn, P, and S.

(Composition of Components)

It is only required to select a composition of components capable of securing the tensile strength (750 MPa to 2500 MPa) of the high-strength steel plate described above. When considering that a steel member after being subjected to spot welding is mainly used in the automobile field and the like, the composition of components of the high-strength steel plate is preferably the following composition of components. Note that in the description hereinbelow, % means mass %.

((C: 0.07 mass % to 0.45 mass %))

C is an element which increases a tensile strength of steel. It is possible that the higher a C content in the steel is, the higher a strength of a nugget becomes. However, if the C content in the steel is less than 0.07 mass %, it is difficult to obtain a tensile strength of 750 MPa or more. On the other hand, if the C content in the steel exceeds 0.45 mass %, a workability of the high-strength steel plate is lowered.

Therefore, the C content in the high-strength steel plate is preferably 0.07 mass % to 0.45 mass %.

((Si: 0.001 mass % to 2.50 mass %))

Si is an element which increases a strength of steel by solid solution strengthening and structure strengthening. However, if a Si content in the steel exceeds 2.50 mass %, the workability of the steel is lowered. Meanwhile, it is technically difficult to reduce the Si content in the steel to less than 0.001 mass % industrially. Therefore, the Si content in the high-strength steel plate is preferably 0.001 mass % to 2.50 mass %.

((Mn: 0.8 mass % to 5.0 mass %))

Mn is an element which increases a strength of steel. However, if a Mn content in the steel exceeds 5.0 mass %, the workability of the steel deteriorates. On the other hand, if the Mn content in the steel is less than 0.8 mass %, it is difficult to obtain a tensile strength of 750 MPa or more. Therefore, the Mn content in the high-strength steel plate is preferably 0.8 mass % to 5.0 mass %.

((P: 0.03 mass % or less))

P is an element which causes embrittlement of a nugget. If a P content in steel exceeds 0.03 mass %, a crack in a nugget is apt to occur, and it is difficult to obtain a sufficiently high joint strength. Therefore, the P content in the high-strength steel plate is preferably 0.03 mass % or less. Note that it is not preferable, in terms of cost, to reduce the P content in the steel to less than 0.001 mass %. Therefore, the P content in the high-strength steel plate is preferably 0.001 mass % or more. However, it is also possible to set the P content in the high-strength steel plate to less than 0.001 mass %.

((S: 0.01 mass % or less))

S is an element which causes embrittlement of a nugget. Further, S is an element which is bonded to Mn to form coarse MnS, thereby hindering the workability of steel. If a S content in the steel exceeds 0.01 mass %, a crack in the nugget is apt to occur, which makes it difficult to obtain a sufficiently high joint strength. Further, the workability of the steel is lowered. Therefore, the S content in the high-strength steel plate is preferably 0.01 mass % or less. Note that it is not preferable, in terms of cost, to reduce the S content in the steel to less than 0.0001 mass %. Therefore, the S content in the high-strength steel plate is preferably 0.0001 mass % or more. However, it is also possible to set the S content in the high-strength steel plate to less than 0.0001 mass %.

((N: 0.01 mass % or less))

N is an element which forms a coarse nitride to deteriorate the workability of steel. Further, N is an element which causes a generation of blowhole at a time of welding. If a N content in the steel exceeds 0.01 mass %, the deterioration of the workability of steel and the generation of blowhole are caused prominently. Therefore, the N content in the high-strength steel plate is preferably 0.01 mass % or less. Note that it is not preferable, in terms of cost, to reduce the N content in the steel to less than 0.0005 mass %. Therefore, the N content in the high-strength steel plate is preferably 0.0005 mass % or more. However, it is also possible to set the N content in the high-strength steel plate to less than 0.0005 mass %.

((O: 0.01 mass % or less))

O is an element which forms an oxide to deteriorate the workability of steel. If an O content in the steel exceeds 0.01 mass %, the deterioration of the workability of steel is caused prominently. Therefore, the O content in the high-strength steel plate is preferably 0.01 mass % or less. Note that it is not preferable, in terms of cost, to reduce the O content in the high-strength steel plate to less than 0.0005 mass %. Therefore, the O content in the high-strength steel plate is preferably 0.0005 mass % or more. However, it is also possible to set the O content in the high-strength steel plate to less than 0.0005 mass %.

((Al: 1.00 mass % or less))

Al is a ferrite stabilizing element and exhibits an effect such as a suppression of precipitation of cementite during a bainite transformation. Accordingly, Al is contained for controlling a steel structure. Further, Al also functions as a deoxidizer. On the other hand, Al is easily oxidized. If an Al content exceeds 1.00 mass %, inclusions increase, resulting in that the deterioration of the workability of steel is apt to occur. Therefore, the Al content in the high-strength steel plate is preferably 1.00 mass % or less.

The high-strength steel plate may selectively contain the following elements according to need, other than the above-described main elements.

((Ti: 0.005 mass % to 0.20 mass %))
((Nb: 0.005 mass % to 0.20 mass %))
((V: 0.005 mass % to 0.20 mass %))

Ti, Nb, and V are elements which contribute to an increase in a strength of steel by at least any one of precipitation strengthening, fine grain strengthening by a suppression of growth of a ferrite crystal grain, and dislocation strengthening by a suppression of recrystallization. However, if a content of any of the elements in steel is less than 0.005 mass %, the effect of adding the elements is difficult to be exhibited. On the other hand, if the content of each of these elements in the steel exceeds 0.20 mass %, the workability of the steel is hindered. Therefore, it is preferable that the contents of these elements in the high-strength steel plate are respectively 0.005 mass % to 0.20 mass %.

((B: 0.0001 mass % to 0.01 mass %))

B is an element which strengthens steel by controlling a steel structure. However, if a B content in the steel is less than 0.0001 mass %, the effect of adding the element is difficult to be exhibited. On the other hand, if the B content in the steel exceeds 0.01 mass %, the effect of adding the element is saturated. Therefore, the B content in the high-strength steel plate is preferably 0.0001 mass % to 0.01 mass %.

((Cr: 0.01 mass % to 2.0 mass %))
((Ni: 0.01 mass % to 2.0 mass %))
((Cu: 0.01 mass % to 2.0 mass %))
((Mo: 0.01 mass % to 0.8 mass %))

Cr, Ni, Cu, and Mo are elements which contribute to an improvement of strength of steel. These elements can be used in place of a part of Mn (strength improving element), for example. However, if a content of any of the elements in the steel is less than 0.01 mass %, no contribution is made for improving the strength.

Therefore, it is preferable that the contents of these elements in the high-strength steel plate are respectively 0.01 mass % or more. On the other hand, if the content of each of Cr, Ni, and Cu in the steel exceeds 2.0 mass %, and if the Mo content in the steel exceeds 0.8 mass %, problems sometimes occur at a time of pickling or hot working. Therefore, it is preferable that the content of each of Cr, Ni, and Cu in the high-strength steel plate is 2.0 mass % or less. Further, it is preferable that the Mo content in the high-strength steel plate is 0.8 mass % or less.

(At least one kind of Ca, Ce, Mg, and REM (rare earth metal): 0.0001 mass % to 1.0 mass % in total)

Ca, Ce, Mg, and REM are elements which contribute to an improvement of the workability of steel by reducing a size of an oxide after deoxidation or a size of a sulfide existing in a hot-rolled steel plate. However, if contents of these elements in the steel are less than 0.0001 mass % in total, the effect of adding the elements is difficult to be exhibited. On the other hand, if the contents of these elements in the steel exceed 1.0 mass % in total, the workability of the steel is reduced. Therefore, it is preferable that the contents of these elements in the high-strength steel plate are 0.0001 mass % to 1.0 mass % in total.

Note that REM is an element which belongs to a lanthanoide series, and REM and Ce can be added as misch metals to molten steel in a stage of steelmaking. Further, other than La and Ce, elements of the lanthanoide series may be contained compositely.

A balance other than the respective elements described above in the high-strength steel plate may be constituted of Fe and inevitable impurities. Note that regarding any one of Cr, Ni, Cu, Mo, B, Ti, Ni, and V described above, containing a very small amount less than the above lower limit values as impurities is tolerated. Further, regarding Ca, Ce, Mg, La, and REM, containing a very small amount less than the above lower limit values of the total amounts thereof as impurities is tolerated.

The above is the explanation regarding the composition of components of the high-strength steel plate, and a composition of components of a steel plate to be overlapped with the high-strength steel plate may employ any composition of components.

(Plating)

A plating layer may be formed on a surface of the high-strength steel plate. Further, it is also possible that a plating layer is formed on a surface of a steel plate to be overlapped with the high-strength steel plate. As kinds of the plating layer, there can be cited, for example, a Zn base, a Zn—Fe base, a Zn—Ni base, a Zn—Al base, a Zn—Mg base, a Pb—Sn base, a Sn—Zn base, an Al—Si base, and the like.

As the high-strength steel plate including a Zn-based plating layer, there can be cited, for example, an alloyed hot-dip galvanized steel plate, a hot-dip galvanized steel plate, an electrogalvanized steel plate, and the like. When the plating layer is formed on the surface of the high-strength steel plate, a spot-welded joint exhibits an excellent corrosion resistance. If the plating layer is a galvanized layer alloyed on the surface of the high-strength steel plate, an excellent corrosion resistance is obtained, and further, an adhesiveness of coating material becomes good.

A weight of the plating layer is not particularly limited as well. It is preferable to set a weight of the plating layer on one surface of the high-strength steel plate to 100 g/m² or less. If the weight of the plating layer on one surface of the high-strength steel plate exceeds 100 g/m², the plating layer may hinder the welding. The plating layer may be formed on only one surface or both surfaces of the high-strength steel plate. Note that an inorganic or organic coating film (such as, for example, a lubricating coating film) or the like may be formed on a surface layer of the plating layer. Conditions same as the conditions regarding the plating layer described above are applied to a steel plate to be overlapped with the high-strength steel plate.

Next, examples of a spot welding method will be described.

<First Example of Spot Welding Method>

First, a first example of the spot welding method will be described.

[Spot Welding]

FIG. 1 is a diagram illustrating one example of an arrangement of two pieces of steel plates including at least one piece of high-strength steel plate and welding electrodes when spot welding is started. As illustrated in FIG. 1, steel plates 1A and 1B are overlapped so that their plate surfaces face each other. The overlapped steel plates 1A and 1B are sandwiched by welding electrodes 2A and 2B from up and down directions, and by applying a required pressurizing force, the welding electrodes 2A and 2B are energized.

Figure 2:
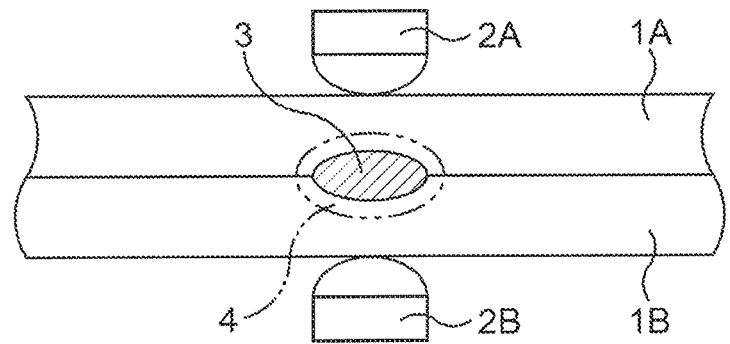
FIG. 2 is a diagram schematically illustrating one example of a nugget and a heat-affected zone formed by the spot welding.
Figure 3:
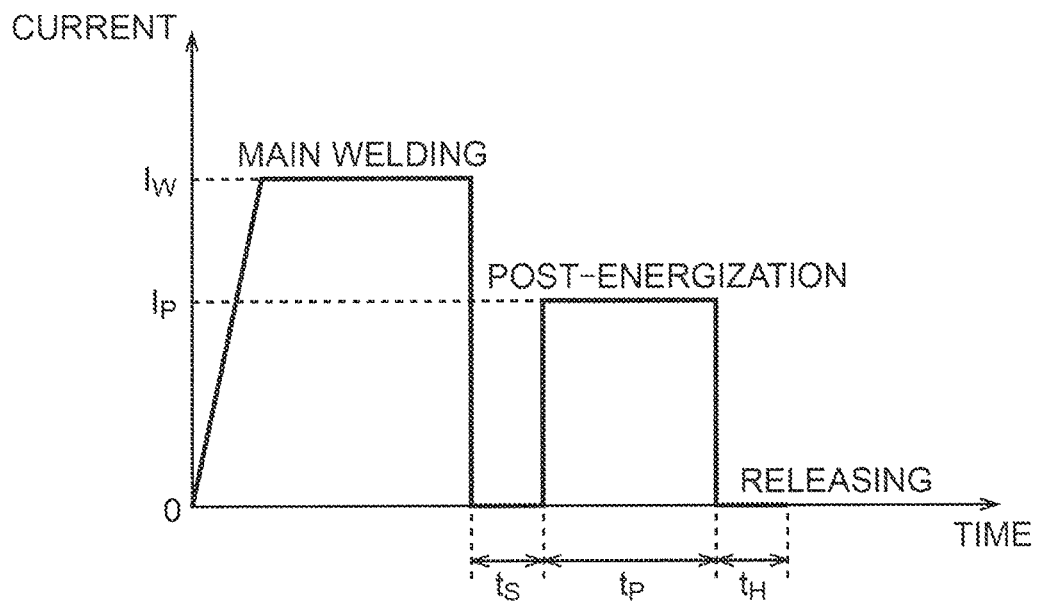
FIG. 3 is a diagram illustrating an example of first form of an energization pattern.

FIG. 2 is a diagram schematically illustrating one example of a nugget and a heat-affected zone formed by the spot welding. FIG. 3 is a diagram illustrating an example of first form of an energization pattern when the energization is performed on the welding electrodes. Note that in this case, in order to simplify the explanation, a case where two pieces of steel plates including at least one piece of high-strength steel plate are spot-welded, is cited as an example. However, as described above, even in a case where three pieces or more of steel plates including at least one piece of high-strength steel plate are spot-welded, it is possible to conduct the spot welding through a method same as a method to be described below.

The steel plates 1A and 1B, and the welding electrodes 2A and 2B are arranged in a manner as illustrated in FIG. 1. Further, when energization is performed in an energization pattern illustrated in FIG. 3, for example, a nugget 3 is formed at a boundary between the steel plates 1A and 1B, as illustrated in FIG. 2. Further, a heat-affected zone 4 is formed in a periphery of the nugget 3. Note that at least one of the steel plates 1A and 1B is the above-described high-strength steel plate.

The following is the explanation regarding the energization pattern illustrated in FIG. 3. Note that a current to be described below indicates a current which flows between the welding electrode 2A and the welding electrode 2B.

First, a current value is gradually increased (up-sloped) from 0 (zero) until when it reaches a value of a main welding current $I_W$ (kA). Further, main welding is performed under a state where the current value is set to the value of the main welding current $I_W$ (kA). When the main welding is finished, the current value is set to 0 (zero), and a state where the current value is 0 (zero) is retained for a cooling time after main welding (solidification time) $t_S$ (msec). After the cooling time after main welding $t_S$ (msec) passes, the current value is set to a value of a post-energization current $I_P$ (kA), and a state where the current value is the value of the post-energization current $I_P$ (kA) is retained for a post-energization time $t_P$ (msec), thereby performing post-energization. After the post-energization time $t_P$ (msec) passes, the current value is set to 0 (zero).

Note that a retention time $t_H$ (msec) indicated in FIG. 3 corresponds to a time of retaining a pressurizing force $F_E$ (N) after the post-energization is finished, as will be described later.

Further, it is also possible to design such that the current value is not gradually increased (up-sloped) from 0 (zero) until when it reaches the value of the main welding current $I_W$ (kA), and the current value is immediately set to the value of the main welding current $I_W$ (kA).

(Pressurizing Force: $F_E$)

The energization with the main welding current $I_W$ is performed while pressurizing the overlapped plurality of pieces of steel plates by the welding electrodes 2A and 2B at the pressurizing force $F_E$ satisfying the following expression (2).

$$1960 \times h \leq F_E \leq 3920 \times h \qquad (2)$$

h: plate thickness of steel plate (mm)

The pressurizing force $F_E$ of the welding electrodes 2A and 2B with respect to the steel plates 1A and 1B, exerts a large influence on an occurrence of a defect or a crack inside the nugget 3 and in the heat-affected zone 4. If the pressurizing force $F_E$ is less than "1960×h" (N), a suppression of the occurrence of the defect or the crack inside the nugget 3 and in the heat-affected zone 4 becomes difficult. As a result of this, it is not possible to improve a fracture appearance of a spot-welded joint, and thus it is difficult to achieve an improvement of joint strength and a reduction in fluctuation of joint strength.

On the other hand, if the pressurizing force $F_E$ exceeds "3920×h" (N), a region which is brought into contact with each of the welding electrodes 2A and 2B, in a region of the steel plates 1A and 1B, is indented largely. Therefore, an external appearance is impaired, and in addition to that, the joint strength is lowered. Further, in order to obtain the pressurizing force $F_E$ exceeding "3920×h" (N), a welding gun (a device which performs energization by applying a pressurizing force to the welding electrodes 2A and 2B) is required to have a robot arm with a high stiffness. Therefore, in the present embodiment, the pressurizing force $F_E$ of the welding electrodes 2A and 2B with respect to the steel plates 1A and 1B is set to not less than "1960×h" (N) nor more than "3920×h" (N).

Note that if diameters of tips of the welding electrodes 2A and 2B become too large, surface pressures at the tips of the welding electrodes 2A and 2B are reduced. Accordingly, it becomes difficult to improve the fracture appearance. Further, it becomes difficult to achieve the improvement of the joint strength and the reduction in the fluctuation of the joint strength, which are realized in accordance with the improvement of the fracture appearance. Therefore, it is preferable that the diameters of the tips of the welding electrodes 2A and 2B are respectively about 6 mm to 8 mm.

In the above expression (2), h indicates a plate thickness of a steel plate (mm). Plate thicknesses of two pieces of steel plates are sometimes different (in an example illustrated in FIG. 2, plate thicknesses of the steel plates 1A and 1B are sometimes different). In this case, it is only required to use an arithmetic average value of the plate thicknesses of the two pieces of steel plates (an arithmetic average value of the plate thickness of the steel plate 1A and the plate thickness of the steel plate 1B), as "h" in the above expression (2). If spot welding is performed on a plurality of pieces of steel plates whose number is three or more, a total sum of plate thicknesses of the plurality of pieces of steel plates is determined, and a value obtained by halving the total sum may be used as "h" in the above expression (2).

(Main Welding Current: $I_W$)

The welding electrodes 2A and 2B are energized with the main welding current $I_W$ while pressurizing the steel plates 1A and 1B at the above-described pressurizing force $F_E$, to thereby perform the main welding. The main welding current $I_W$ and a main welding time (a time during which the main welding current $I_W$ is flowed) are not particularly limited. It is only required to employ a welding current and an energization time which are nearly the same as a welding current and an energization time conventionally employed for stably obtaining a nugget with a required size, as the main welding current $I_W$ and the main welding time.

Note that, for example, a square root of an average value in the main welding time of values each of which being a square of the main welding current in the main welding time (specifically, an effective value of the main welding current), or a maximum value of the main welding current, can be employed as the main welding current $I_W$.

As a spot welding equipment, a conventional spot welding equipment commonly used can be used as it is. Further, regarding welding electrodes and the like, it is also possible to use conventional welding electrodes as they are. A power supply is not limited in particular as well, and an AC power supply, a DC inverter, an AC inverter, or the like can be used.

(Cooling Time after Main Welding: $t_S$)

The energization of the welding electrodes 2A and 2B with the main welding current $I_W$ is performed for a predetermined time, and right after the energization is finished, the energization is stopped while the pressurizing force $F_E$ applied when performing the main welding (when the energization with the main welding current $I_W$ is conducted) is retained as it is. Subsequently, that state is retained for a cooling time after main welding $t_S$ (msec) satisfying the following expression (3). Accordingly, a molten zone is solidified from an outer periphery of the molten zone (specifically, a boundary of the molten zone with another region), to thereby form a shell-shaped solidified region having an unsolidified region remained inside thereof. Note that in the description hereinbelow, the boundary of the molten zone with the other region is referred to as a melting boundary according to need.

$$7 \times h + 5 \leq t_S \leq 300 \qquad (3)$$

h: plate thickness of steel plate (mm)

Figure 4:
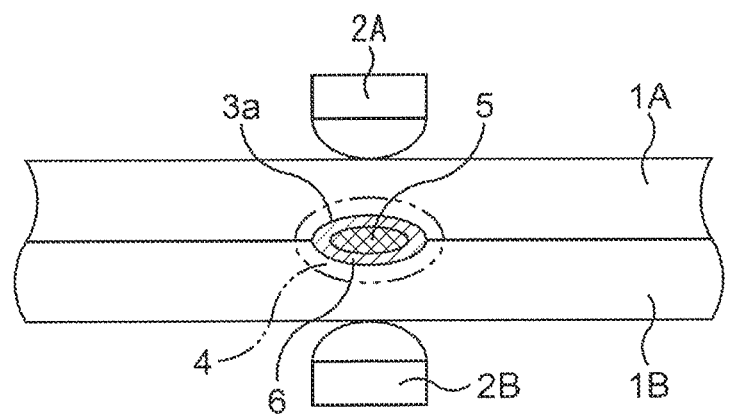
FIG. 4 is a diagram schematically illustrating one example of an appearance in the middle of solidification of a molten zone which is solidified to be a nugget.

Right after the finish of energization with the main welding current $I_W$, the solidification of the molten zone is started from the melting boundary. FIG. 4 is a diagram schematically illustrating one example of an appearance in the middle of solidification of the molten zone which is solidified to be a nugget.

When the welding electrodes 2A and 2B are energized with the main welding current $I_W$ while pressurizing the steel plates 1A and 1B at the pressurizing force $F_E$, a molten zone which is solidified to be a nugget is formed. Thereafter, when the energization is finished, the solidification is started from a melting boundary 3a, and after the cooling time after main welding $t_S$ passes, a solidified region 5 is formed. At this moment, an unsolidified region 6 remains inside the solidified region 5. In a periphery of the solidified region 5, a heat-affected zone 4 is formed.

The unsolidified region 6 is solidified to form a nugget. In the present embodiment, post-energization is started when the unsolidified region 6 exists. Specifically, the cooling time after main welding $t_S$ determines a width (length in a plate surface direction) of the solidified region 5 at the time of starting the post-energization.

In a high-strength steel plate having a relatively large carbon amount, a martensite transformation occurs in a process of performing cooling for the cooling time after main welding $t_S$ after the main welding. At this time, when a prior austenite grain is large, an apparent martensite transformation temperature increases. When the martensite transformation temperature increases, automatic tempering (auto-temper) easily occurs. Therefore, the toughness of the heat-affected zone 4 is improved by later-described post-energization. In order to achieve this effect, the heat-affected zone 4 is required to be formed of an austenite single phase. In order to realize that, the cooling time after main welding $t_S$ has to be set to 300 (msec) or less.

Further, if the cooling time after main welding $t_S$ exceeds 300 (msec), a temperature is lowered to enlarge the solidified region 5. Therefore, the post-energization for a long time has to be performed for obtaining an effect of post-energization to be described later (effect of structure improvement and segregation improvement) in an outer peripheral portion of the nugget 3 and the heat-affected zone 4 in the periphery of the nugget 3. Accordingly, the productivity of the spot-welded joint is lowered. As described above, the cooling time after main welding $t_S$ exceeding 300 (msec) is not realistic.

On the other hand, if the cooling time after main welding $t_S$ is less than "7×h+5" (msec), the solidification of the molten zone becomes insufficient, resulting in that the width of the solidified region 5 becomes narrow. Further, if the cooling time after main welding $t_S$ is less than "7×h+5" (msec), the prior austenite grain becomes too large, resulting in that the toughness of the heat-affected zone 4 is lowered, on the contrary, by the post-energization to be described later. Therefore, it is not possible to achieve the effect of post-energization to be described later (effect of structure improvement and segregation improvement), resulting in that it becomes difficult to sufficiently improve the joint strength. Further, the larger the plate thickness h of the steel plate is, the slower a cooling rate of the steel plates 1A and 1B becomes. Generally, the larger the plate thickness h of the steel plate is, the longer a cooling time of the steel plates 1A and 1B becomes exponentially. However, in a general thickness range of a steel plate employed for a spot-welded joint (0.5 mm to 3.2 mm, for example), a relationship between the cooling time of the steel plates 1A and 1B and the plate thickness h of the steel plate can be linearly approximated. Therefore, in the present embodiment, a lower limit value of the cooling time after main welding $t_S$ is represented by a linear expression using the plate thickness h of the steel plate, as represented by the expression (3).

Two pieces of steel plates with various plate thicknesses each having the carbon equivalent Ceq represented by the above expression (1) of 0.3 mass % or more, were overlapped to be spot-welded by using a servo gun-type welding machine and performing main welding, cooling, and post-energization, in this order, with various energization patterns. Subsequently, the CTS (cross tensile strength) of each spot-welded joint was measured based on a method defined in JIS Z 3137. In the description hereinbelow, the spot-welded joint is referred to as a welded joint obtained by first unconventional welding, according to need.

Further, a spot-welded joint having a nugget diameter same as a nugget diameter of the welded joint obtained by first unconventional welding, was obtained by overlapping two pieces of steel plates each having the above-described carbon equivalent and the above-described plate thickness, and performing spot welding through a method same as the above-described method except for the performance of the cooling after the main welding and the post-energization. Subsequently, the CTS (cross tensile strength) of each spot-welded joint was measured based on the method defined in JIS Z 3137. In the description hereinbelow, the spot-welded joint is referred to as a welded joint obtained by first conventional welding, according to need.

The CTS in the welded joint obtained by first unconventional welding, and the CTS in the welded joint obtained by first conventional welding in which no post-energization was performed, were compared.

Figure 5:
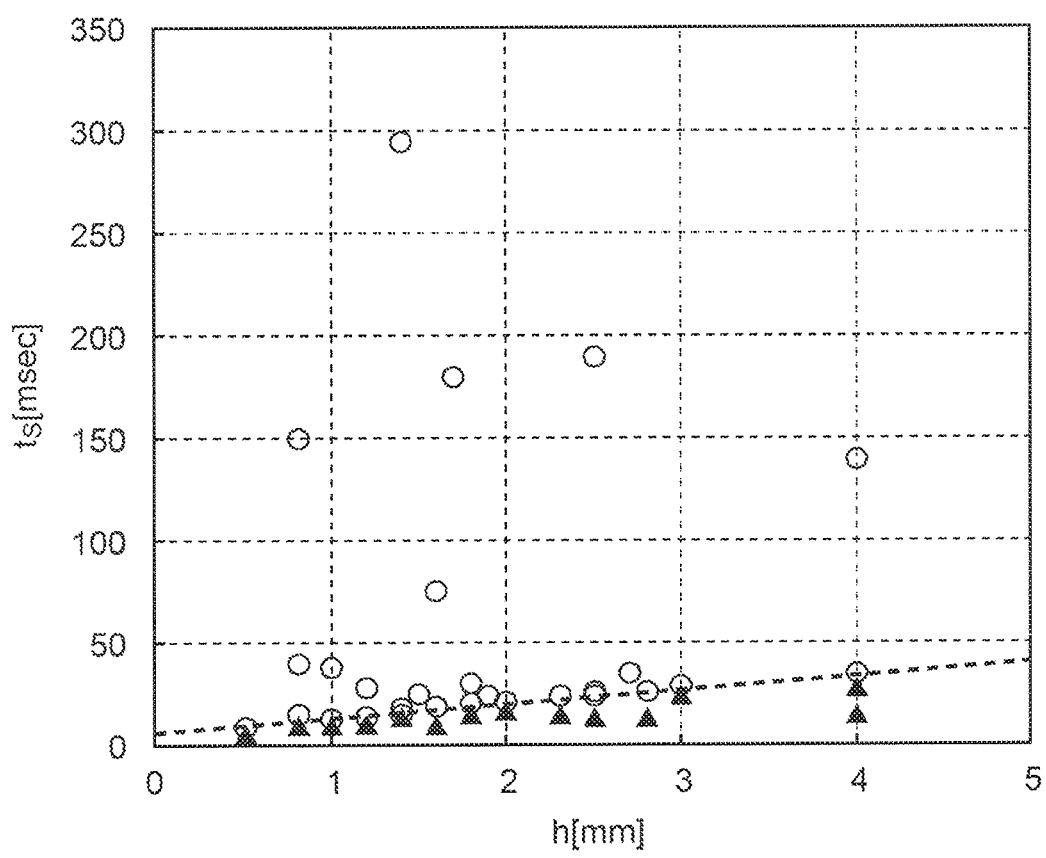
FIG. 5 is a diagram illustrating one example of a relationship between a cooling time after main welding and a plate thickness of a steel plate.

FIG. 5 is a diagram illustrating one example of a relationship between the cooling time after main welding $t_S$ and the plate thickness h of the steel plate.

In FIG. 5, a plot based on the cooling time after main welding $t_S$ and the plate thickness h of the steel plate when the CTS in the welded joint obtained by first unconventional welding was improved by 20% or more, when compared to the CTS in the welded joint obtained by first conventional welding, is indicated by ○. Further, a plot based on the cooling time after main welding $t_S$ and the plate thickness h of the steel plate when the CTS in the welded joint obtained by first unconventional welding was improved but an amount of improvement was less than 20% or when it was not improved, when compared to the CTS in the welded joint obtained by first conventional welding, is indicated by ▲. As illustrated in FIG. 5, a horizontal axis indicates h (mm), and a vertical axis indicates $t_S$ (msec).

In FIG. 5, a boundary line between ○ and ▲ was determined as a regression curve. From a result of the determination, a linear expression defining the lower limit value in the above expression (3) was obtained.

From the above description, in the present embodiment, the cooling time after main welding $t_S$ is set to not less than "7×h+5" (msec) nor more than 300 (msec).

Note that in order to avoid the reduction in productivity of the spot-welded joint, it is more preferable to set the cooling time after main welding $t_S$ to not less than "7×h+5" (msec) nor more than 250 (msec). Further, in order to facilitate the formation of the solidified region 5, it is preferable that no energization is performed during the cooling time after main welding $t_S$. However, it is also possible to energize the welding electrodes 2A and 2B with a current which is 0.5 times or less the main welding current $I_W$ for the cooling time after main welding $t_S$ for adjusting a formation speed and a temperature of the solidified region 5.

Note that as the plate thickness h of the steel plate in the expression (3), a value same as the value of the plate thickness h of the steel plate in the above expression (2) is employed, for example. Further, it is preferable, in terms of working efficiency, that the pressurizing force $F_E$ applied when performing the main welding is retained as it is during the cooling time after main welding $t_S$. However, it is also possible that the pressurizing force $F_E$ during the cooling time after main welding $t_S$ is different from the pressurizing force $F_E$ applied when performing the main welding, within a range satisfying the above expression (2).

(Post-Energization Current: $I_P$, Post-Energization Time: $t_P$)

When the cooling time after main welding $t_S$ is passed, and right after the solidified region 5 with a required width is formed, the welding electrodes 2A and 2B are energized with a post-energization current $I_P$ (kA) satisfying the following expression (4) for a post-energization time $t_P$ (msec) satisfying the following expression (5) while retaining the pressurizing force $F_E$ (N) applied when performing the main welding, to thereby conduct post-energization.

$$0.66 \times I_W \leq I_P < I_W \quad (4)$$

$I_W$: main welding current (kA)

$$48/(\alpha^2 - 0.44) \leq t_P \quad (5)$$

$\alpha = I_P/I_W$

Therefore, the expression (5) can be rewritten as follows.

$$48/\{(I_P/I_W)^2 - 0.44\} \leq t_P \quad (5)$$

As described above, the pressuring force $F_E$ during the post-energization time $t_P$ is set to the pressurizing force satisfying the above expression (2). It is preferable, in terms of working efficiency, that this pressurizing force $F_E$ is normally set to a pressurizing force same as the pressurizing force $F_E$ applied when performing the main welding (when the energization with the main welding current $I_W$ is performed), and when the molten zone is solidified from the melting boundary to form the shell-shaped solidified region 5 (during the cooling time after main welding $t_S$). However, as long as the pressurizing force is within a range satisfying the above expression (2), the pressurizing force $F_E$ during the post-energization time $t_P$ does not always have to be the same pressurizing force as that applied when performing these operations.

The post-energization current $I_P$ exerts a large influence on a structure and a segregation of the shell-shaped solidified region 5, a structure and a segregation of the nugget 3 formed after the completion of solidification, and a structure and a segregation of the heat-affected zone 4.

If the post-energization current $I_P$ is less than "$0.66 \times I_W$" (kA), a heat input in the solidified region 5 and the heat-affected zone 4 is insufficient, resulting in that the effect of improving the structure and the segregation (effect of structure improvement and segregation improvement) cannot be achieved.

On the other hand, if the post-energization current $I_P$ is equal to or more than the main welding current $I_W$ (kA), a temperature of the solidified region 5 and the heat-affected zone 4 increases too much. Further, the solidified region 5 is melted again. Therefore, the effect of improving the structure and the segregation (effect of structure improvement and segregation improvement) cannot be achieved.

Accordingly, in the present embodiment, the post-energization current $I_P$ is set to "$0.66 \times I_W$" (kA) or more and less than "$I_W$" (kA). Note that in order to obtain the effect of improving the structure and the segregation more securely, it is preferable to set the post-energization current $I_P$ to not less than "$0.70 \times I_W$" (kA) nor more than "$0.98 \times I_W$" (kA). Note that when an effective value is employed as the main welding current $I_W$, it is preferable that the post-energization current $I_P$ also employs an effective value. Further, when a maximum value is employed as the main welding current $I_W$, it is preferable that the post-energization current $I_P$ also employs a maximum value.

In the spot welding method of the present embodiment, the welding electrodes 2A and 2B are energized with the post-energization current $I_P$ for a time satisfying the above expression (5) (post-energization time $t_P$ (msec)). Accordingly, the structure and the segregation in the solidified region 5 and the heat-affected zone 4 are improved, to thereby increase the reliability of the welded joint.

Regarding the post-energization time $t_P$, there is a description, in a paragraph [0087] in Patent Literature 5, that "when the time exceeds 200 msec, the effect of improving the joint strength and reducing the fluctuation of joint strength becomes small, and further, the productivity is lowered". Specifically, Patent Literature 5 discloses that the post-energization time $t_P$ should be set to 200 (msec) or less.

However, in recent years, the improvement of CTS in high-strength steel plates is a pressing issue. Accordingly, the present inventors conducted earnest studies regarding the method of further increasing the joint strength of the spot-welded joint, without sticking to conventional common sense and biased view.

Patent Literature 5 describes a structure inside a nugget. However, no description is made regarding an improvement plan of CTS when a plug fracture occurs. Accordingly, the present inventors conducted systematic experiments regarding post-energization which further increases the CTS when the plug fracture occurs.

As described in the section of (cooling time after main welding: $t_S$), two pieces of steel plates with various plate thicknesses each having the carbon equivalent Ceq represented by the above expression (1) of 0.3 mass % or more, were overlapped to be spot-welded by using a servo gun-type welding machine and performing main welding, cooling, and post-energization, in this order, with various energization patterns. Subsequently, the CTS (cross tensile strength) of each spot-welded joint was measured based on the method defined in JIS Z 3137. As described in the section of (cooling time after main welding: $t_S$), in the description hereinbelow, the spot-welded joint is referred to as the welded joint obtained by first unconventional welding, according to need.

Further, as described in the section of (cooling time after main welding: $t_S$), a spot-welded joint having a nugget diameter same as a nugget diameter of the welded joint obtained by first unconventional welding, was obtained by overlapping two pieces of steel plates each having the above-described carbon equivalent and the above-described plate thickness, and performing spot welding through a method same as the above-described method except for the performance of the cooling after the main welding and the post-energization. Subsequently, the CTS (cross tensile strength) of each spot-welded joint was measured based on the method defined in JIS Z 3137. As described in the section of (cooling time after main welding: $t_S$), in the description hereinbelow, the spot-welded joint is referred to as the welded joint obtained by first conventional welding, according to need.

The CTS in the welded joint obtained by first unconventional welding, and the CTS in the welded joint obtained by first conventional welding in which no post-energization was performed, were compared.

Figure 6:
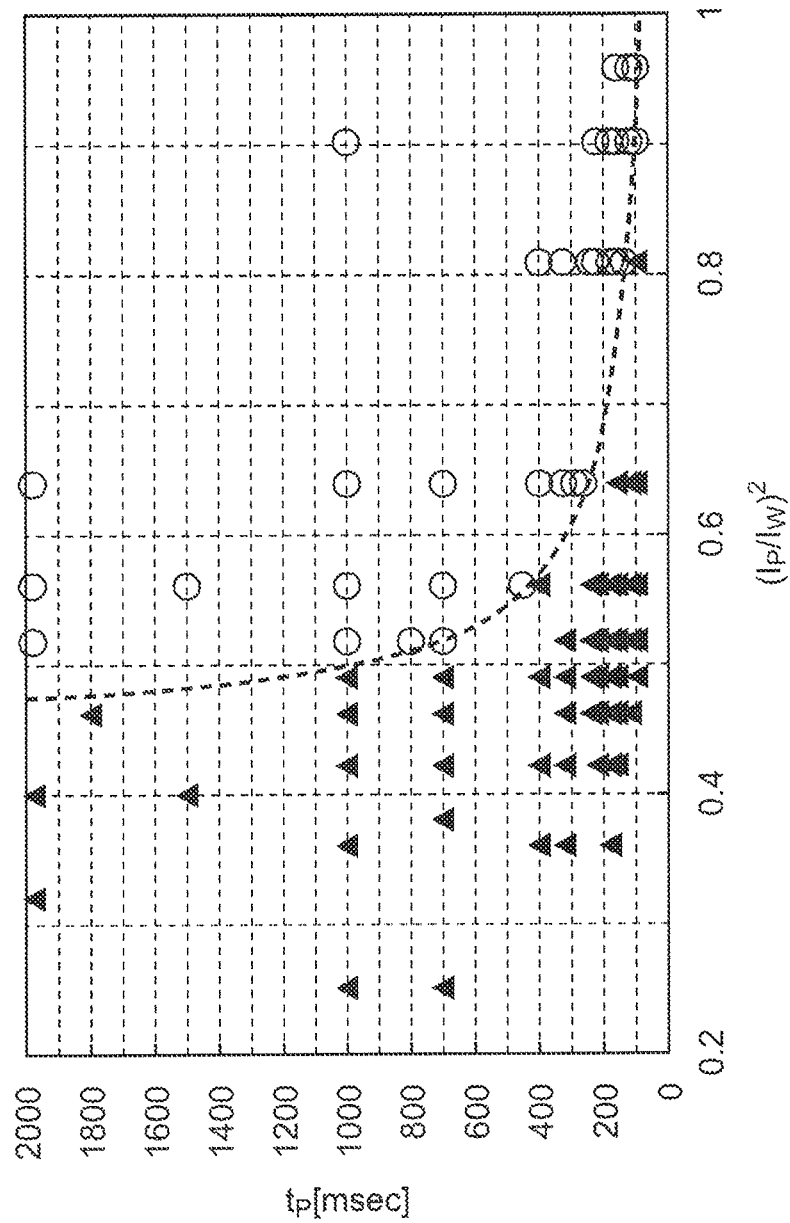
FIG. 6 is a diagram illustrating a first example of a relationship between a post-energization time and a square of a value obtained by dividing a post-energization current by a main welding current.

FIG. 6 is a diagram illustrating a first example of a relationship between the post-energization time $t_P$ and a square of a value obtained by dividing the post-energization current $I_P$ by the main welding current $I_W$ ($(I_P/I_W)^2$).

In FIG. 6, a plot based on the post-energization time $t_P$, the post-energization current $I_P$, and the main welding current $I_W$, when the CTS in the welded joint obtained by first unconventional welding was improved by 20% or more, when compared to the CTS in the welded joint obtained by first conventional welding, is indicated by ○. Further, a plot based on the post-energization time $t_P$, the post-energization current $I_P$, and the main welding current $I_W$, when the CTS in the welded joint obtained by first unconventional welding was improved but an amount of improvement was less than 20% or when it was not improved, when compared to the CTS in the welded joint obtained by first conventional welding, is indicated by ▲. As illustrated in FIG. 6, a horizontal axis indicates $(I_P/I_W)^2$, and a vertical axis indicates $t_P$ (ms).

The plug fracture in the spot-welded joint occurs in the heat-affected zone 4. Therefore, it was estimated that a difference in plug fracture strengths is generated by a difference in resistance forces with respect to a propagation of crack in the heat-affected zone 4, namely, a difference in toughness of the heat-affected zone 4. Accordingly, a concentration distribution of P and S exerting a large influence on the toughness of the heat-affected zone 4 was measured through FE-EPMA. As a result of this, in FIG. 6, it was found out that in the heat-affected zone 4 of the welded joint obtained by first unconventional welding obtained under the conditions (the post-energization time $t_P$, the post-energization current $I_P$, and the main welding current $I_W$) indicated by ○, the segregation of P and S is greatly reduced, when compared to that in the heat-affected zone 4 of the welded joint obtained by first conventional welding. Specifically, it can be assumed that the outer peripheral portion of the nugget 3 and the heat-affected zone 4 were retained at a high temperature by the heat generated through the post-energization, resulting in that the segregation of P and S was greatly reduced.

If the solidified region 5 formed in the inner periphery of the melting boundary is melted again by the post-energization, the segregation of P and S increases in the resolidified resolidified region, resulting in that the toughness of the nugget 3 is lowered. As a result of this, the fracture occurs inside the nugget 3 even under a low load. Therefore, the post-energization current $I_P$ is required to be a current of a value at which the melting of the solidified region 5 does not occur. Specifically, it is required to satisfy the condition of $I_W > I_P$. The $I_P/I_W$ is an index of determining a heat input amount when performing the post-energization (a size of the nugget 3). Accordingly, the $I_P/I_W$ is expressed as $\alpha$ (<1).

The heat generated in the post-energization is in proportion to a square of the post-energization current $I_P$. Therefore, in FIG. 6, the horizontal axis takes $(I_P/I_W)^2$. Further, a part of the heat generated in the post-energization is escaped to all over the welding electrodes 2A and 2B and steel plates 1A and 1B. A quantity of the heat to be escaped is set to $\beta$. Accordingly, a heat quantity Q which acts on the increase in temperature of the nugget 3 and the heat-affected zone 4 during the post-energization, can be represented by the following expression (6).

$$Q \propto (\alpha^2 - \beta) \times t_P \qquad (6)$$

$$\alpha = I_P/I_W$$

As described above, by determining the cooling time after main welding $t_S$ as in the expression (3), the automatic tempering caused by the post-energization is apt to occur. There is a need to perform energization with the post-energization current $I_P$ for a time required for improving the toughness of the heat-affected zone 4 realized by the automatic tempering.

Further, in order to reduce the segregation of P and S in the outer peripheral portion of the nugget 3 and the heat-affected zone 4 in the periphery of the nugget 3 to sufficiently improve the toughness of the nugget 3 and the heat-affected zone 4, a heat quantity exceeding a heat quantity A being a predetermined quantity is required.

Therefore, a condition for improving the toughness of the spot-welded zone is represented by an expression (8), which is obtained by modifying the following expression (7).

$$A < (\alpha^2 - \beta) \times t_P \qquad (7)$$

$$A/(\alpha^2 - \beta) < t_P \qquad (8)$$

In FIG. 6, a boundary line between ○ and ▲ was determined as a regression curve (specifically, coefficients A and $\beta$ in the expression (8) were determined). From a result of the determination, the above expression (5) was obtained.

In order to realize the diffusion of P and S to reduce the segregation of P and S in the outer peripheral portion of the nugget 3 and the heat-affected zone 4, there is a need to heat the outer peripheral portion of the nugget 3 and the heat-affected zone 4 to 1050° C. or more. In order to realize that, a condition satisfying $\alpha \geq 0.66$ is required.

Figure 7:
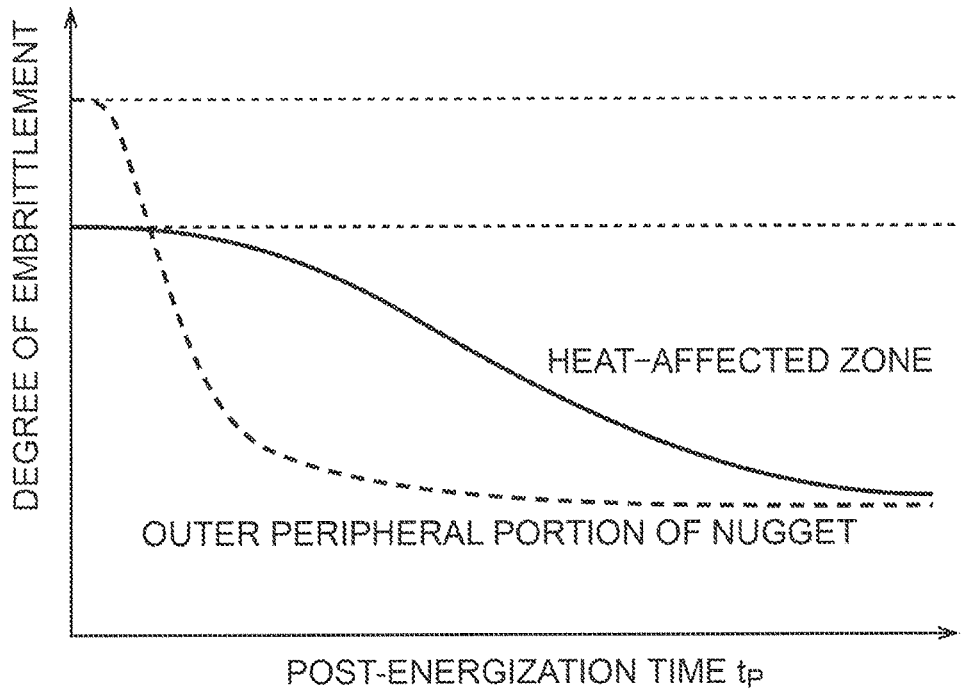
FIG. 7 is a diagram illustrating, in a conceptual manner, one example of a relationship between the post-energization time and a degree of embrittlement of an outer peripheral portion of the nugget and the heat-affected zone.

FIG. 7 is a diagram illustrating, in a conceptual manner, one example of a relationship between the post-energization time $t_P$ and a degree of embrittlement of the outer peripheral portion of the nugget 3 and the heat-affected zone 4. FIG. 7 illustrates, in a conceptual manner, a sequence of events in which the segregation of P and S is reduced and the toughness is improved. In FIG. 7, a vertical axis indicates a degree of embrittlement caused by the segregation or insufficient automatic tempering. As the value on the vertical axis is lowered, the segregation is reduced and the automatic tempering is sufficiently performed, resulting in that the toughness is improved. A temperature in the outer peripheral portion of the nugget 3 reaches a substantially steady temperature ($\approx$: melting point) due to the main welding performed for forming the welded portion, and thus is completely increased. On the contrary, a temperature of the heat-affected zone 4 is not sufficiently increased by the main welding.

Further, when the post-energization is started, the temperature of the heat-affected zone 4 is lower than the temperature of the outer peripheral portion of the nugget 3 which is just solidified and thus has a high temperature. For this reason, it takes a long time to perform heat treatment by retaining the heat-affected zone 4 at a high temperature with the use of the post-energization, when compared to a time required for performing heat treatment on the outer peripheral portion of the nugget 3. This can be estimated to be a reason why the result in FIG. 6 can be obtained.

If the post-energization time $t_P$ is less than 200 (msec), a range of selection of the aforementioned $\alpha$ ($=I_P/I_W$) becomes narrow (refer to FIG. 6). Therefore, it is preferable to set the post-energization time $t_P$ to 200 (msec) or more, and it is more preferable to set the post-energization time $t_P$ to 400 (msec) or more. Although an upper limit value of the post-energization time $t_P$ is not particularly defined, the upper limit value is preferably 2000 (msec) or less, when the productivity of the spot-welded joint is taken into consideration.

(Retention Time: $t_H$)

After the post-energization is performed under the above-described conditions, the mutually overlapped steel plates 1A and 1B are pressurized and retained by the welding electrodes 2A and 2B for a retention time $t_H$ (msec) defined by the following expression (9), and then the pressurizing is released.

$$0 \leq t_H \leq 300 \qquad (9)$$

Note that the pressurizing force $F_E$ (N) applied when the steel plates 1A and 1B are pressurized and retained by the welding electrodes 2A and 2B for the retention time $t_H$ within the range represented by the expression (9), is within a range defined by the above expression (2), for example.

The retention time $t_H$ exerts an influence on an occurrence of a defect or a crack in a structure of the nugget 3 and the heat-affected zone 4 and inside the nugget 3. When the retention time $t_H$ exceeds 300 (msec), the productivity of the spot-welded joint is lowered. Therefore, in the present embodiment, the retention time $t_H$ is set to 300 (msec) or less. The retention time $t_H$ is desirably short, in order to stably achieve a desired effect by starting air cooling in an early stage.

Note that in an existing welding machine, an operation of a welding gun is delayed, so that the actual retention time $t_H$ normally becomes longer than the set retention time $t_H$. Therefore, there is a need to take the above fact into consideration to set the retention time $t_H$.

Further, the temperature of the nugget 3 is lowered also when the post-energization is performed. Accordingly, even if the retention time $t_H$ is shortened, a contraction defect or a crack is difficult to occur. Therefore, if it is possible to immediately separate the welding electrodes 2A and 2B from the steel plates 1A and 1B, the retention time $t_H$ may also be set to 0 (zero). When the retention time is not set to 0 (zero), the expression (9) becomes the following expression (9a).

$$0 < t_H \leq 300 \qquad (9a)$$

<Second Example of Spot Welding Method>

Next, a second example of the spot welding method will be described. In the first example of the spot welding method, explanation was made by citing a case where two times of energization including the main welding and the post-energization are performed, as an example. On the contrary, in the second example of the spot welding method, explanation will be made by citing a case where pre-energization is performed, and then main welding and post-energization are performed, as an example. As described above, the present example is different from the first example in a point that the pre-energization is added, and a point that the above expression (5) can be changed because of the addition of the pre-energization. Therefore, in the explanation of the present example, parts same as those of the first example are denoted by reference numerals same as those in FIG. 1 to FIG. 7, to thereby omit detailed explanation.

Also in the present example, the steel plate 1A and the steel plate 1B are overlapped so that their plate surfaces face each other, as illustrated in FIG. 1. The overlapped steel plate 1A and steel plate 1B are sandwiched by the welding electrode 2A and the welding electrode 2B from up and down directions, and the energization is performed by applying a required pressurizing force. Also in the present example, in order to simplify the explanation, a case where two pieces of steel plates including at least one piece of high-strength steel plate are spot-welded, is cited as an example. However, even in a case where three pieces or more of steel plates including at least one piece of high-strength steel plate are spot-welded, it is possible to conduct the spot welding through a method same as a method to be described below. For example, in a state where, out of three pieces or more of steel plates including at least two pieces of high-strength steel plates, the at least two pieces of high-strength steel plates are mutually overlapped, the three pieces or more of steel plates can be spot-welded.

A high-strength steel plate generally has a large electrical resistance, so that heat generation is apt to occur when performing main welding. Further, when performing main welding, a gap between mutually adjacent two pieces of steel plates may exist. If an internal pressure of a molten metal exceeds an external pressure which acts on a corona bond when performing main welding, an expulsion occurs. One of objects of performing the pre-energization is to suppress the occurrence of expulsion.

Figure 8:
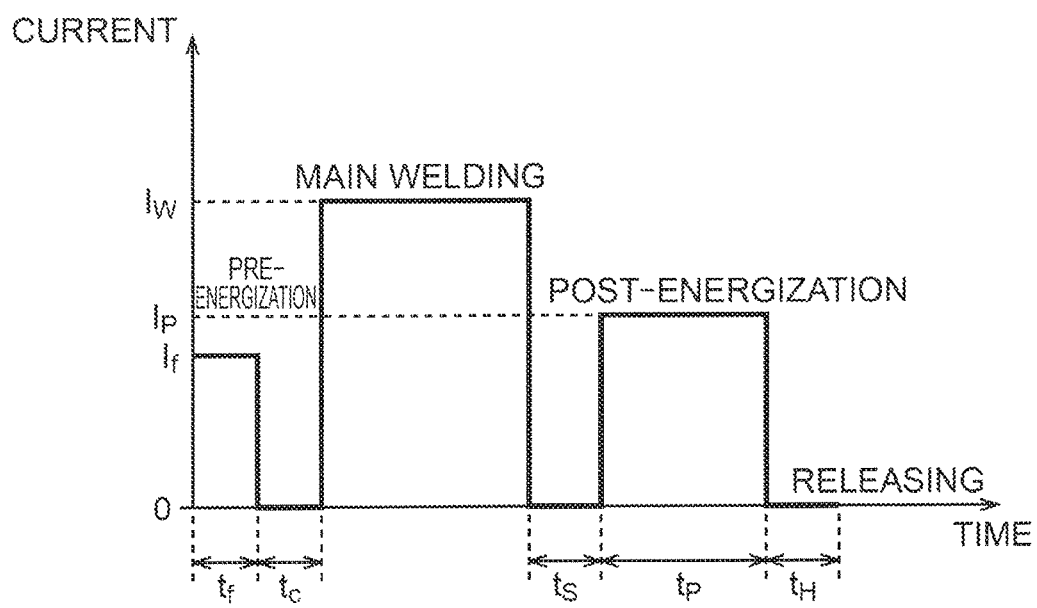
FIG. 8 is a diagram illustrating an example of second form of an energization pattern.

FIG. 8 is a diagram illustrating an example of second form of an energization pattern when performing energization on welding electrodes.

First, a current value is set to a value of pre-energization current $I_f$ (kA), and a state where the current value is the value of pre-energization current $I_f$ (kA) is retained for a pre-energization time $t_f$ (msec), to thereby perform pre-energization. After the pre-energization time $t_f$ (msec) passes, the current value is set to 0 (zero), and a state where the current value is 0 (zero) is retained for a cooling time after pre-energization $t_C$ (msec). After the cooling time after pre-energization $t_C$ passes, the main welding is performed under a state where the current value is set to the value of the main welding current $I_W$ (kA). When the main welding is finished, the current value is set to 0 (zero), and a state where the current value is 0 (zero) is retained for the cooling time after main welding (solidification time) $t_S$ (msec). After the cooling time after main welding $t_S$ (msec) passes, the current value is set to the value of the post-energization current $I_P$ (kA), and a state where the current value is the value of the post-energization current $I_P$ (kA) is retained for the post-energization time $t_P$ (msec), thereby performing the post-energization. After the post-energization time $t_P$ (msec) passes, the current value is set to 0 (zero). Note that the retention time $t_H$ (msec) indicated in FIG. 8 corresponds to a time of retaining the pressurizing force $F_E$ (N) after the post-energization is finished, as described in the first example. Further, it is also possible to design such that, when the pre-energization is started, the current value is not set to the value of the pre-energization current $I_f$ (kA) immediately, and is gradually increased (up-sloped) from 0 (zero) until when it reaches the value of the pre-energization current $I_f$ (kA).

(Pressurizing Force: $F_E$)

The energization with the pre-energization current $I_f$ is performed while pressurizing the overlapped plurality of pieces of steel plates by the welding electrodes 2A and 2B at the pressurizing force $F_E$ satisfying the above expression (2). In the pre-energization, the overlapped plurality of pieces of steel plates are pressurized to prevent a generation of gap between the adjacent two pieces of steel plates 1A and 1B. In the present embodiment, a range of the pressurizing force $F_E$ in the pre-energization is set to a range same as the range of the pressurizing force $F_E$ applied in the main welding and the post-energization, thereby increasing the working efficiency.

(Pre-Energization Current: $I_f$, Pre-Energization Time: $t_f$)

While pressurizing the steel plates 1A and 1B at the pressurizing force $F_E$ described above, energization with the pre-energization current $I_f$ (kA) satisfying the following expression (10) is performed between the welding electrodes 2A and 2B for the pre-energization time $t_f$ (msec) satisfying the following expression (11), to thereby perform the pre-energization.

$$0.40 \times I_W \leq I_f < I_W \tag{10}$$

$I_W$: main welding current (kA)

$$20 \leq t_f \tag{11}$$

If the pre-energization current $I_f$ is set to equal to or more than the main welding current $I_W$, there is a possibility that the expulsion occurs when performing the pre-energization. On the other hand, if the pre-energization current $I_f$ is set to less than 0.4 times the main welding current $I_W$, a quantity of heat to be supplied to the steel plates 1A and 1B becomes insufficient. Consequently, there is a possibility that the steel plates 1A and 1B cannot be softened, and it is not possible to sufficiently reduce the gap between the steel plates 1A and 1B by the above-described pressurizing, resulting in that the expulsion occurs when performing the main welding.

From the above description, in the present embodiment, the pre-energization current $I_f$ is set to 0.4 times or more the main welding current $I_W$ and less than the main welding current $I_W$. However, in order to suppress the occurrence of expulsion more securely, it is preferable to set the pre-energization current $I_f$ to fall within a range of 0.6 times or more the main welding current $I_W$ and 0.95 times or less the main welding current $I_W$.

Note that when an effective value is employed as the main welding current $I_W$, it is preferable that the pre-energization current $I_f$ also employs an effective value. Further, when a maximum value is employed as the main welding current $I_W$, it is preferable that the pre-energization current $I_f$ also employs a maximum value.

If the pre-energization time $t_f$ is less than 20 (msec), a quantity of heat to be supplied to the steel plates 1A and 1B becomes insufficient. Consequently, there is a possibility that the steel plates 1A and 1B cannot be softened, and it is not possible to sufficiently reduce the gap between the steel plates 1A and 1B by the above-described pressurizing, resulting in that the expulsion occurs when performing the main welding.

When the main welding current $I_W$ within the range represented by the above expression (10) is employed, even if the pre-energization time $t_f$ is long, it is possible to suppress the occurrence of expulsion when performing the main welding. Therefore, although an upper limit value of the pre-energization time $t_f$ is not particularly defined, the upper limit value is preferably 300 (msec) or less, when the productivity of the spot-welded joint is taken into consideration.

(Cooling Time after Pre-Energization: $t_C$)

When the energization with the pre-energization current $I_f$ is performed for the pre-energization time $t_f$, and right after the energization is finished, the energization is stopped while retaining the pressurizing force $F_E$ applied when performing the pre-energization (when the energization with the pre-energization current $I_f$ is performed) as it is. Subsequently, that state is retained for the cooling time after pre-energization $t_C$ (msec) satisfying the following expression (12).

$$0 \le t_C < 200+7h \quad (12)$$

h: plate thickness of steel plate (mm)

For the growth of corona bond, the cooling time after pre-energization $t_C$ can be set to a time exceeding 0 (zero). Note that if there is no occurrence of expulsion when performing the pre-energization, it is possible to set the cooling time after pre-energization $t_C$ to 0 (zero). Further, if the cooling time after pre-energization $t_C$ becomes "200+7×h" (msec) or more, the steel plates 1A and 1B are cooled too much, resulting in that conformability of the steel plates 1A and 1B may be lost when performing the main welding. The larger the plate thickness h of the steel plate is, the slower the cooling rate of the steel plates 1A and 1B becomes. As described in the section of (cooling time after main welding: $t_S$) in the first example, in the general thickness range of the steel plate employed for the spot-welded joint (0.5 mm to 3.2 mm, for example), the relationship between the cooling time of the steel plates 1A and 1B and the plate thickness h of the steel plate can be linearly approximated. Therefore, in the present embodiment, an upper limit value of the cooling time after pre-energization $t_C$ is represented by a linear expression using the plate thickness h of the steel plate, as represented by the expression (12).

Two pieces of steel plates with various plate thicknesses each having the carbon equivalent Ceq represented by the above expression (1) of 0.3 mass % or more, were overlapped in which a gap was provided to a part of region or a whole region between these two pieces of steel plates in various appearances, and spot-welded by using a servo gun-type welding machine and performing pre-energization, cooling, main welding, cooling, and post-energization, in this order, with various energization patterns. Subsequently, examination was made regarding whether or not the expulsion occurs when performing the main welding.

Figure 9:
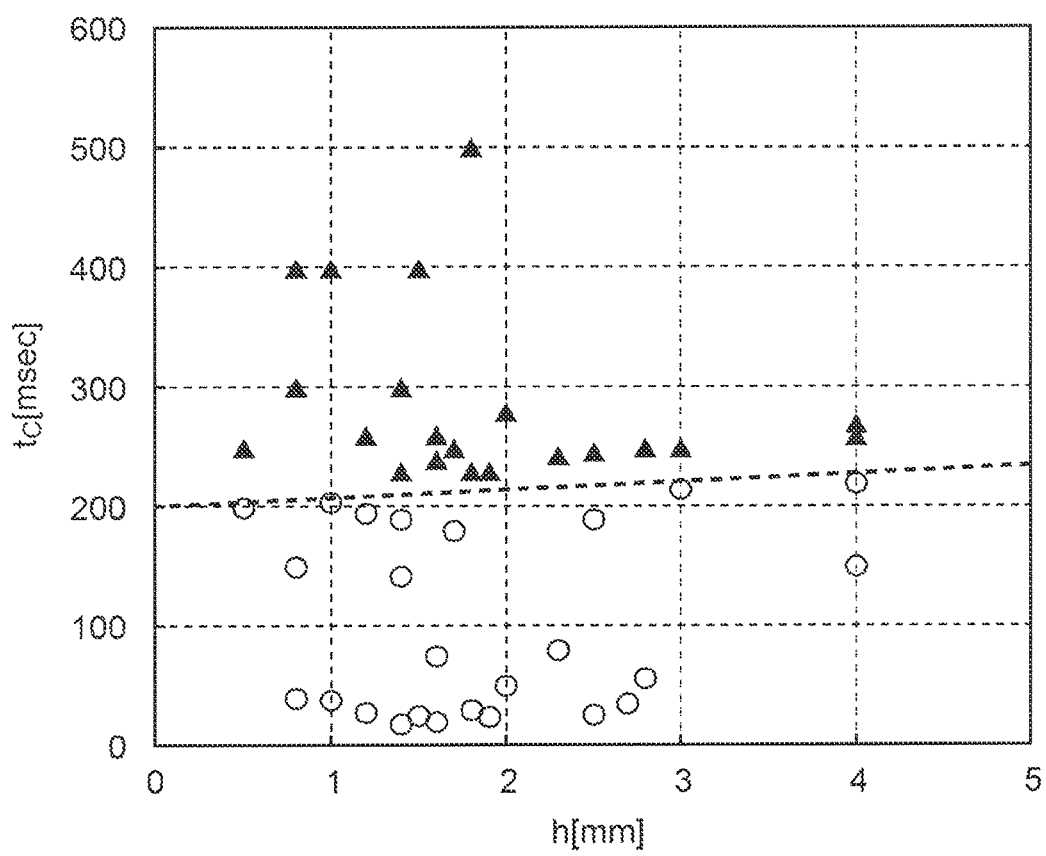
FIG. 9 is a diagram illustrating one example of a relationship between a cooling time after pre-energization and a plate thickness of a steel plate.

FIG. 9 is a diagram illustrating one example of a relationship between the cooling time after pre-energization $t_C$ and the plate thickness h of the steel plate.

In FIG. 9, a plot based on the cooling time after pre-energization $t_C$ and the plate thickness h of the steel plate when the expulsion did not occur in the aforementioned examination, is indicated by ○. Further, a plot based on the cooling time after pre-energization $t_C$ and the plate thickness h of the steel plate when the expulsion occurred in the aforementioned examination, is indicated by ▲. As illustrated in FIG. 9, a horizontal axis indicates h (mm), and a vertical axis indicates $t_C$ (msec).

In FIG. 9, a boundary line between ○ and ▲ was determined as a regression curve. From a result of the determination, a linear expression defining the upper limit value in the above expression (12) was obtained.

From the above description, in the present embodiment, the cooling time after pre-energization $t_C$ is set to not less than 0 (zero) nor more than "200+7×h" (msec).

Note that as the plate thickness h of the steel plate in the expression (12), a value same as the value of the plate thickness h of the steel plate in the above expression (2) is employed, for example. Further, it is preferable, in terms of working efficiency, that the pressurizing force $F_E$ applied when performing the pre-energization is retained as it is during the cooling time after pre-energization $t_C$. However, it is also possible that the pressurizing force $F_E$ during the cooling time after pre-energization $t_C$ is different from the pressurizing force $F_E$ applied when performing the pre-energization, within a range satisfying the above expression (2).

Further, when the cooling time after pre-energization $t_C$ is secured, the expression (12) becomes the following expression (12a).

$$0 < t_C < 200+7 \times h \quad (12a)$$

(Main Welding Current: $I_W$)

Right after the cooling time after pre-energization $t_C$ passes, energization with the main welding current $I_W$ is performed between the welding electrodes 2A and 2B while retaining the pressurizing force $F_E$ applied when performing the pre-energization as it is, to thereby conduct the main welding. As explained in the first example, the main welding current $I_W$ and the main welding time (the time during which the energization with the main welding current $I_W$ is conducted) are not particularly limited. Note that it is preferable, in terms of working efficiency, that the pressurizing force $F_E$ applied when performing the pre-energization is retained as it is during the main welding time. However, it is also possible that the pressurizing force $F_E$ during the main welding time is different from the pressurizing force $F_E$ applied when performing the pre-energization, within a range satisfying the above expression (2).

(Cooling Time after Main Welding: $t_S$)

When the energization with the main welding current $I_W$ is performed for a predetermined time, and right after the energization is finished, the energization is stopped while retaining the pressurizing force $F_E$ applied when performing the pre-energization and the main welding as it is. Further, that state is retained for the cooling time after main welding $t_S$ (msec) satisfying the above expression (3).

A method of determining the cooling time after main welding $t_S$ is a method same as that of the first example. Note that as described in the first example, in order to avoid the reduction in the productivity of the spot-welded joint, the cooling time after main welding $t_S$ is more preferably set to not less than "7×h+5" (msec) nor more than 250 (msec). Further, in order to facilitate the formation of the solidified region 5, it is preferable that no energization is performed during the cooling time after main welding $t_S$, but, it is also possible to perform energization with a current which is 0.5 times or less the main welding current $I_W$ during the cooling time after main welding $t_S$ for adjusting the formation speed and the temperature of the solidified region 5. Further, it is preferable, in terms of working efficiency, that the pressurizing force $F_E$ applied when performing the pre-energization and the main welding is retained as it is during the cooling time after main welding $t_S$. However, it is also possible that the pressurizing force $F_E$ during the cooling time after main welding $t_S$ is different from the pressurizing force $F_E$ applied when performing the pre-energization and the main welding, within a range satisfying the above expression (2).

(Post-Energization Current: $I_P$, Post-Energization Time: $t_P$)

When the cooling time after main welding $t_S$ is passed, and right after the solidified region 5 with a required width is formed, energization with the post-energization current $I_P$ (kA) satisfying the following expression (13) is performed for the post-energization time $t_P$ (msec) satisfying the following expression (14) while retaining the pressurizing force $F_E$ (N) applied when performing the pre-energization and the main welding, to thereby conduct the post-energization.

$$0.66 \times I_W \leq I_P < I_W \quad (13)$$

$I_W$: main welding current (kA)

$$48/(\alpha^2 - 0.4) \leq t_P \quad (14)$$

$\alpha = I_P / I_W$

Therefore, the expression (14) can be rewritten as follows.

$$48/\{(I_P/I_W)^2 - 0.4\} t_P \quad (14)$$

The expression (13) is the same as the above expression (4). Specifically, a method of determining the post-energization current $I_P$ is a method same as that of the first example. Note that as described in the first example, the post-energization current $I_P$ is preferably set to not less than "$0.70 \times I_W$" (kA) nor more than "$0.98 \times I_W$" (kA), in order to obtain the effect of improving the structure and the segregation more securely. Further, it is preferable, in terms of working efficiency, that the pressurizing force $F_E$ applied when performing the pre-energization and the main welding is retained as it is during the post-energization time $t_P$. However, it is also possible that the pressurizing force $F_E$ during the post-energization time $t_P$ is different from the pressurizing force $F_E$ applied when performing the pre-energization and the main welding, within a range satisfying the above expression (2).

Two pieces of steel plates with various plate thicknesses each having the carbon equivalent Ceq represented by the above expression (1) of 0.3 mass % or more, were overlapped to be spot-welded by using a servo gun-type welding machine and performing pre-energization, cooling, main welding, cooling, and post-energization, in this order, with various energization patterns. Subsequently, the CTS (cross tensile strength) of each spot-welded joint was measured based on the method defined in JIS Z 3137. In the description hereinbelow, the spot-welded joint is referred to as a welded joint obtained by second unconventional welding, according to need.

A spot-welded joint having a nugget diameter same as a nugget diameter of the welded joint obtained by second unconventional welding, was obtained by overlapping two pieces of steel plates each having the above-described carbon equivalent and the above-described plate thickness, and performing spot welding through a method same as the above-described method except for the performance of the cooling after the main welding and the post-energization. Subsequently, the CTS (cross tensile strength) of each spot-welded joint was measured based on the method defined in JIS Z 3137. In the description hereinbelow, the spot-welded joint is referred to as a welded joint obtained by second conventional welding, according to need.

The CTS in the welded joint obtained by second unconventional welding, and the CTS in the welded joint obtained by second conventional welding in which no post-energization was performed, were compared.

FIG. 10 is a diagram illustrating a second example of a relationship between the post-energization time $t_P$ and a square of a value obtained by dividing the post-energization current $I_P$ by the main welding current $I_W$ $((I_P/I_W)^2)$.

In FIG. 10, a plot based on the post-energization time $t_P$, the post-energization current $I_P$, and the main welding current $I_W$, when the CTS in the welded joint obtained by second unconventional welding was improved by 20% or more, when compared to the CTS in the welded joint obtained by second conventional welding, is indicated by ○. Further, a plot based on the post-energization time $t_P$, the post-energization current $I_P$, and the main welding current $I_W$, when the CTS in the welded joint obtained by second unconventional welding was improved but an amount of improvement was less than 20% or when it was not improved, when compared to the CTS in the welded joint obtained by second conventional welding, is indicated by ▲. As illustrated in FIG. 10, a horizontal axis indicates $(I_P/I_W)^2$, and a vertical axis indicates $t_p$ (msec).

FIG. 10 is a diagram corresponding to FIG. 6. In a similar manner to the first example, in FIG. 10, a boundary line between ○ and ▲ was determined as a regression curve (specifically, coefficients A and β in the expression (8) were determined). From a result of the determination, the above expression (14) was obtained.

The expression (14) corresponds to the above expression (5). In the above expression (5), the coefficient β is "0.44". On the contrary, in the expression (14), the coefficient β is "0.4". Therefore, a lower limit value of the post-energization time $t_P$ in the second example becomes smaller than that in the first example. It can be considered that this is because a total heat input amount with respect to the heat-affected zone 4 becomes large because of the performance of pre-energization.

Note that as described in the first example, when the post-energization time $t_P$ is less than 200 (msec), a range of selection of the aforementioned α $(=I_P/I_W)$ becomes narrow (refer to FIG. 10). Therefore, it is preferable to set the post-energization time $t_P$ to 200 (msec) or more, and it is more preferable to set the post-energization time $t_P$ to 400 (msec) or more. Although the upper limit value of the post-energization time $t_P$ is not particularly defined, the upper limit value is preferably 2000 (msec) or less, when the productivity of the spot-welded joint is taken into consideration.

Further, if the expression (14) is employed as in the present example, the lower limit value of the post-energization time $t_P$ can be set to be small. However, in order to prevent an error in setting of the post-energization time $t_P$ by unifying the post-energization time $t_P$ when the pre-energization is performed and the post-energization time $t_P$ when the pre-energization is not performed, it is possible that the present example also employs the above expression (5), instead of the expression (14).

(Retention Time: $t_H$)

After the post-energization is performed under the above-described conditions, the mutually overlapped steel plates 1A and 1B are pressurized and retained by the welding electrodes 2A and 2B for a retention time $t_H$ (msec) defined by the above expression (9), and then the pressurizing is released.

$$0 \leq t_H \leq 300 \quad (9)$$

A method of determining the retention time $t_H$ is a method same as that of the first example. Note that as described in the first example, there is a need to set the retention time $t_H$ by considering the fact that the actual retention time $t_H$ becomes longer than the set retention time $t_H$. Further, as described in the first example, it is also possible to set the retention time $t_H$ to 0 (zero).

<Spot-Welded Joint>

Next, the spot-welded joint of the present embodiment will be described. Note that in the following description, when the above-described welded joint obtained by first conventional welding and the above-described welded joint obtained by second conventional welding are named generically, they are referred to as welded joints obtained by conventional welding according to need. Further, when the above-described welded joint obtained by first unconventional welding and the above-described welded joint obtained by second unconventional welding are named generically, they are referred to as welded joints obtained by unconventional welding according to need.

When spot-welded joints are formed in a manner as in the first example and the second example of the spot welding method, an improvement of toughness in a heat-affected zone (HAZ) was confirmed. In order to find out a reason thereof, the present inventors observed structures of heat-affected zones of the above-described welded joint obtained by conventional welding and the above-described welded joint obtained by unconventional welding, using an electron microscope. Note that in this case, out of the above-described welded joints obtained by unconventional welding, the above-described welded joint obtained by unconventional welding having the CTS which is improved by 20% or more, when compared to the CTS in the above-described welded joint obtained by conventional welding, was employed.

Figure 11A:
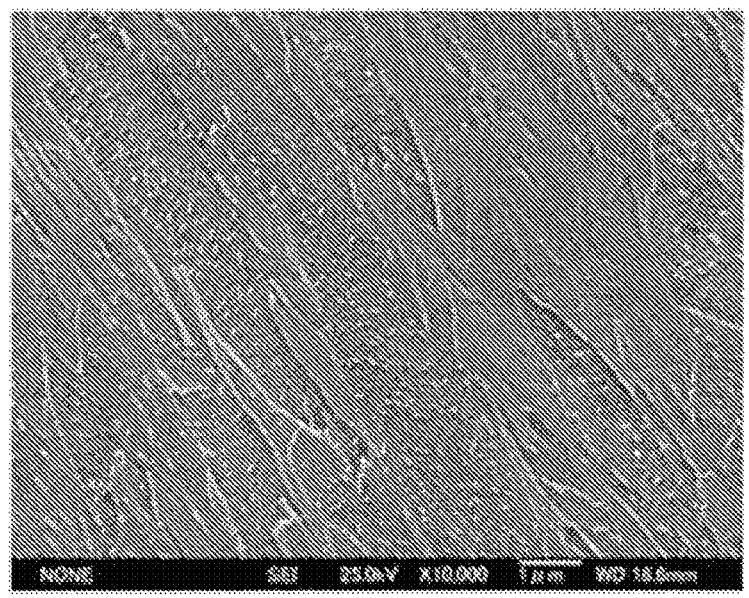
FIG. 11A is a diagram (photograph) illustrating one example of a structure of a heat-affected zone of a welded joint obtained by unconventional welding.
Figure 11B:
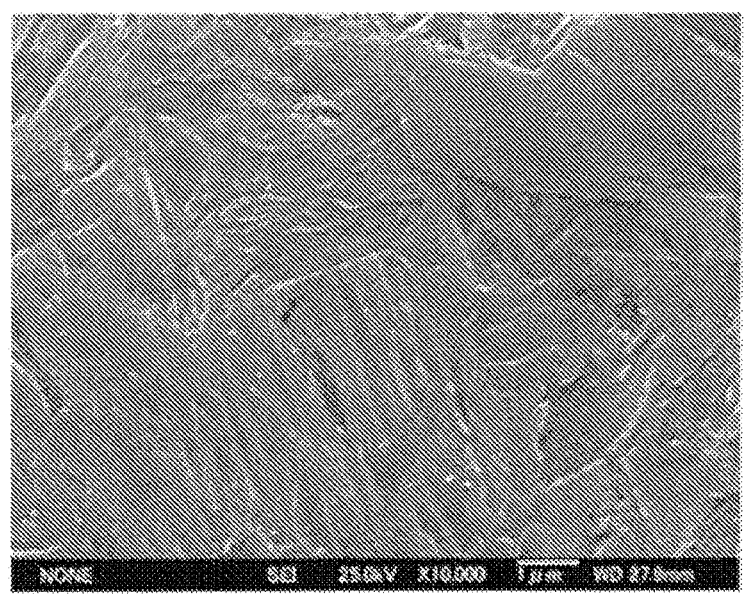
FIG. 11B is a diagram (photograph) illustrating one example of a structure of a heat-affected zone of a welded joint obtained by conventional welding.

FIG. 11A is a diagram (photograph) illustrating one example of a structure of a heat-affected zone of the above-described welded joint obtained by unconventional welding (the above-described welded joint obtained by first unconventional welding). Further, FIG. 11B is a diagram (photograph) illustrating one example of a structure of a heat-affected zone of the above-described welded joint obtained by conventional welding (the above-described welded joint obtained by first conventional welding). As illustrated in FIG. 11A and FIG. 11B, it was possible to confirm that a number of iron-based carbides existing in the heat-affected zone of the above-described welded joint obtained by unconventional welding having the CTS which is improved by 20% or more when compared to the CTS in the above-described welded joint obtained by conventional welding, is larger than that in the above-described welded joint obtained by conventional welding. It was possible to confirm this in both of the first unconventional welding described above and the second unconventional welding described above. The iron-based carbide mentioned here is mainly cementite ($Fe_3C$). However, the iron-based carbide is not limited to cementite. For example, there is a case where ϵ carbide ($Fe_{2.4}C$) or the like is contained in the iron-based carbide. Further, there is a case where another metal of Mn, Cr, or the like is contained in the iron-based carbide.

By performing the post-energization under the conditions of the above expression (4) and expression (5) (the above expression (13) or expression (14)), the heat input with respect to the heat-affected zone 4 is increased, resulting in that a maximum attained temperature in the heat-affected zone 4 can be set to high. Therefore, a prior austenite grain becomes large, which increases an apparent martensite transformation temperature. When the apparent martensite transformation temperature increases, the transformation in the heat-affected zone 4 occurs at a relatively high temperature in a cooling process after the post-energization, resulting in that automatic tempering (auto-temper) easily occurs. Accordingly, a precipitation of fine iron-based carbides is often observed. As described above, the present inventors found out that the precipitation of fine iron-based carbides in the heat-affected zone 4 contributes to the improvement of toughness in the heat-affected zone 4.

Accordingly, the present inventors examined the state of precipitation of the iron-based carbides in the heat-affected zone of each of a plurality of welded joints obtained by unconventional welding having the CTS which is improved by 20% or more when compared to the CTS in the welded joint obtained by conventional welding. As a result of this, it was confirmed that any welded joint obtained by unconventional welding having the CTS which is improved by 20% or more when compared to the CTS in the welded joint obtained by conventional welding, always satisfies the precipitation condition of iron-based carbides to be described below.

Figure 12A:
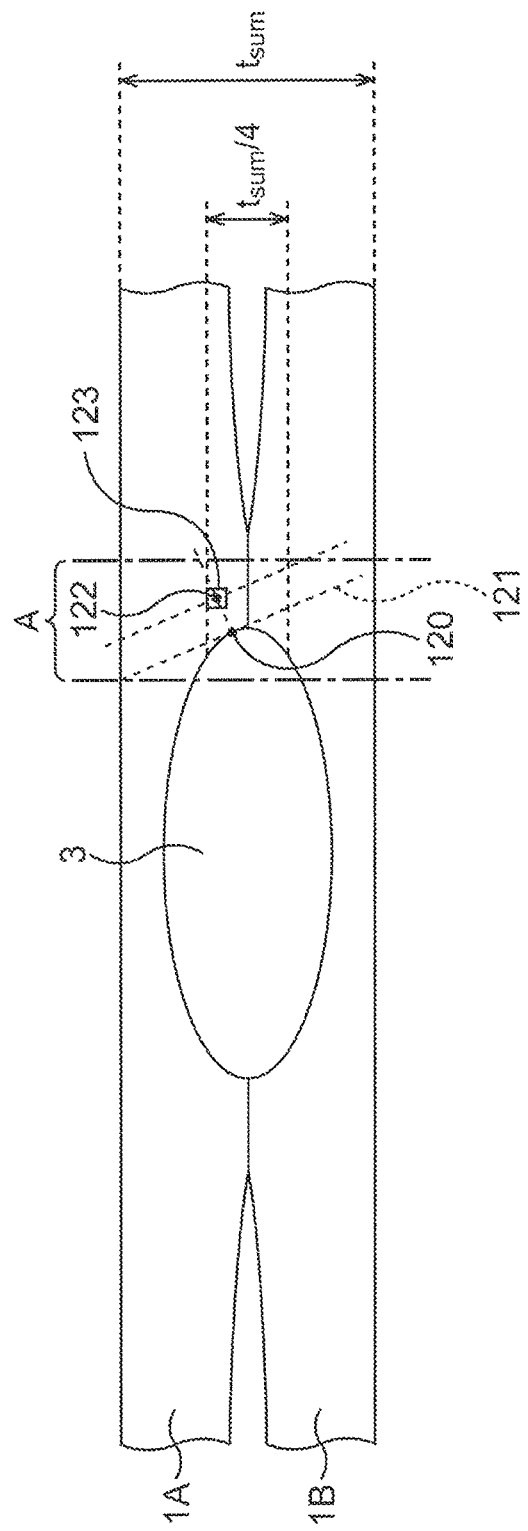
FIG. 12A is a diagram explaining one example of a precipitation condition of iron-based carbides.
Figure 12B:
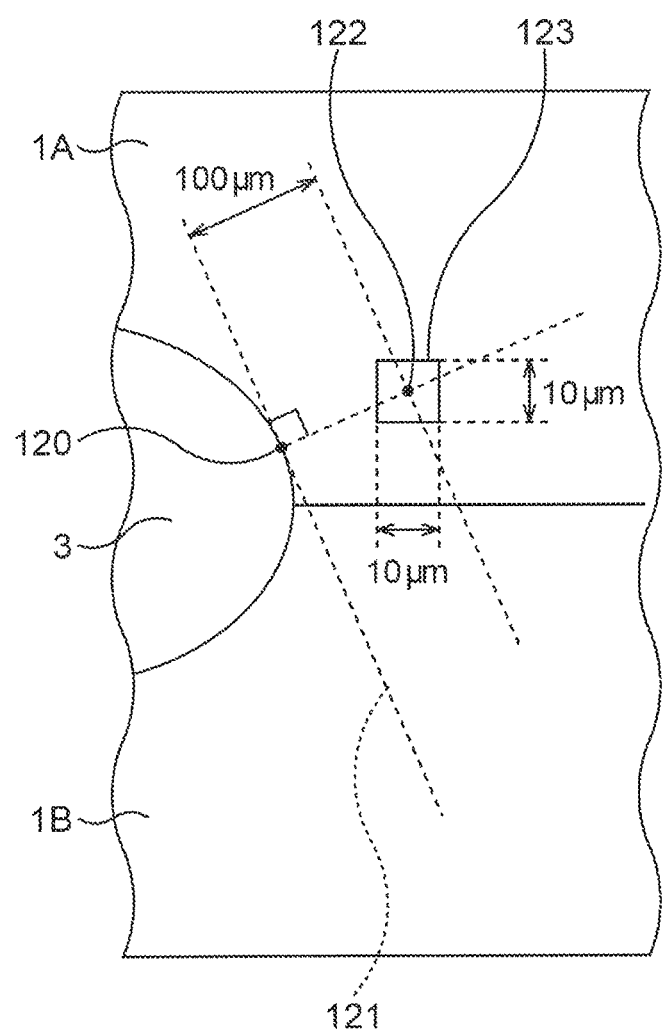
FIG. 12B is a diagram illustrating a part of a region A in FIG. 12A in an enlarged manner.

FIG. 12A is a diagram explaining one example of the precipitation condition of iron-based carbides. FIG. 12B is a diagram illustrating a part of a region A in FIG. 12A in an enlarged manner.

FIG. 12A is a diagram schematically illustrating a cross section that passes through a center of a welding mark formed on surfaces of the steel plates 1A and 1B by the spot welding, and is cut along the plate thickness direction of the steel plates 1A and 1B. As the center of the welding mark, for example, a target position (spot position) of (endmost regions of) the welding electrodes 2A and 2B can be employed. Further, it is also possible that a contour of an actually formed welding mark is approximated by a circle, and a center of the circle is set to the center of the welding mark.

The precipitation condition of iron-based carbides described above is that ten or more of iron-based carbides in each of which a length of a longest portion is 0.1 (μm) or more are precipitated (exist) in a square region 123 whose length of one side is 10 μm in which a plate thickness direction and a plate surface direction of the steel plates 1 and 2 are set to a vertical direction and a horizontal direction, respectively, being a region within the heat-affected zone 4 of such a cross section.

Here, a position of a center of the square region 123 is a position 122, at the cross section, separated by 100 (μm) from a position 120 of an end portion of the nugget 3 in a direction perpendicular to a tangent 121 to a line indicating the end portion of the nugget 3, at that position 120.

Further, the position 120 of the end portion of the nugget 3 is a position, out of positions on the line indicating the end portion of the nugget 3, within a range whose center is set to a center in the plate thickness direction of the spot-welded joint and having a length of ¼ times a total plate thickness $t_{sum}$ being a total value of plate thicknesses of the steel plates 1A and 1B before being subjected to the spot welding, along the plate thickness direction (within a range indicated by $t_{sum}/4$ in FIG. 12A). Note that in FIG. 12A, a length including a part of gap between the steel plates 1A and 1B is represented as the total plate thickness $t_{sum}$, for the convenience of representation. However, actually, the total value of the plate thicknesses of the steel plates 1A and 1B before being subjected to the spot welding, which does not include the length of the part of the gap between the steel plates 1A and 1B, is set to the total plate thickness $t_{sum}$, as described above.

As the position of the center in the plate thickness direction of the spot-welded joint, it is possible to employ, for example, a position of a center of a length in the plate thickness direction of a part passing through the center of the welding mark in the above-described cross section.

Further, as the length of the longest portion of the iron-based carbide, it is possible to employ, for example, a maximum value of a distance between arbitrary two points on a line indicating an end portion of the iron-based carbide, in the above-described cross section. Further, it is also possible to employ a maximum value of a length of a straight line between two points on a line configuring the end portion of the iron-based carbide, being a length of a straight line passing through a position of a center of gravity of the iron-based carbide, in the above-described cross section, as the length of the longest portion of the iron-based carbide.

The reason why the square region 123 is determined as described above, is because such a region 123 is a region inside the heat-affected zone 4, and is also a region in which a crack occurs in an initial stage when a plug fracture occurs in a cross tensile test.

Note that at least one of the steel plates 1A and 1B is the above-described high-strength steel plate. Further, in the example illustrated in FIG. 12A and FIG. 12B, explanation was made by citing a case where the two pieces of steel plates 1A and 1B are spot-welded, as an example. However, the precipitation condition of iron-based carbides described above can also be applied to a case where three pieces or more of steel plates including at least one piece of high-strength steel plate are spot-welded.

An example of a method of observing the iron-based carbides will be described. First, the above-described cross section is polished. Thereafter, an electron micrograph of a region including the square region 123 is photographed. From the electron micrograph, a length of a longest portion of each iron-based carbide is measured, and a number of iron-based carbides in each of which the length of the longest portion is 0.1 (μm) or more is counted. From the number of iron-based carbides, it can be judged whether or not the precipitation condition of iron-based carbides described above is satisfied. Note that in the following description, the above-described square region 123 is referred to as iron-based carbide number counting region, according to need.

It should be noted that all of the above-described embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

EXAMPLES

Next, examples of the present invention will be described. Conditions in the examples are conditional examples employed for confirming applicability and effects of the present invention, and the present invention is not limited to the conditional examples. The present invention can employ various conditions as long as the object of the present invention is achieved without departing from the gist of the present invention.

Steel plates A, B, and C represented in Table 1 were prepared. The steel plate A is obtained by applying Al plating to a surface of a hot-stamped steel plate having a plate thickness of 2.0 (mm) and a tensile strength in the class of 1470 MPa. The steel plate B is obtained by applying Al plating to a surface of a hot-stamped steel plate having a plate thickness of 1.6 (mm) and a tensile strength in the class of 1470 MPa. The steel plate C is obtained by applying Zn plating to a surface of a hot-stamped steel plate having a plate thickness of 1.4 (mm) and a tensile strength in the class of 1470 MPa. Further, steel plates D and E represented in Table 1 were prepared. The steel plate D is obtained by applying Zn plating to a surface of a cold-rolled steel plate having a plate thickness of 1.2 (mm) and a tensile strength in the class of 1180 MPa. The steel plate E is a cold-rolled steel plate having a plate thickness of 1.4 (mm) and a tensile strength in the class of 980 MPa.

Note that Ceq indicated in Table 1 corresponds to the carbon equivalent represented by the expression (1). Further, Table 1 represents only a C content, for the convenience of representation. The steel plates A to E are steel plates each containing the above-described composition of components within the ranges of upper limits and lower limits described above.

TABLE 1

| STEEL PLATE | STEEL TYPE | STRENGTH CLASS | PLATE THICKNESS [mm] | C CONTENT [MASS %] | Ceq | PLATING |
|---|---|---|---|---|---|---|
| A | HOT-STAMPED | 1470 MPa | 2.0 | 0.17 | 0.34 | Al |
| B | HOT-STAMPED | 1470 MPa | 1.6 | 0.18 | 0.35 | Al |
| C | HOT-STAMPED | 1470 MPa | 1.4 | 0.19 | 0.36 | Zn |
| D | COLD-ROLLED | 1180 MPa | 1.2 | 0.22 | 0.44 | Zn |
| E | COLD-ROLLED | 980 MPa | 1.4 | 0.24 | 0.43 | NOT APPLIED |

Two pieces of steel plates in the combination of the same steel type and the same plate thickness were overlapped, and subjected to spot welding by using a servo gun-type welding machine under welding conditions of numbers 1-1 to 1-33, and 2-1 to 2-18, represented in Tables 2 to 6. Further, the CTS (cross tensile strength) of each spot-welded joint was measured by the method defined in JIS Z 3137. Measured results are represented in the section of CTS and the section of strength ratio to joint obtained by conventional welding in Tables 7 and 8.

In Tables 7 and 8, the strength ratio to joint obtained by conventional welding is obtained by multiplying a value as a result of dividing a value obtained by subtracting, from the CTS in the spot-welded joint formed under the welding conditions represented by the numbers 1-1 to 1-33, and 2-1 to 2-18 (the CTS in the welded-joint obtained by unconventional welding), the CTS in the spot-welded joint formed under conditions same as the welding conditions except for the performance of the cooling after the main welding and the post-energization (the CTS in the welded joint obtained by conventional welding), by the CTS in the spot-welded joint formed under the welding conditions (the CTS in the welded joint obtained by unconventional welding), by 100. Note that also in FIG. 5, FIG. 6, and FIG. 10, a type of plot is changed based on whether or not the strength ratio to joint obtained by conventional welding is improved by 20% or more. The reason why the criterion is whether or not the strength ratio to joint obtained by conventional welding is improved by 20% or more, is because if the strength ratio to joint obtained by conventional welding is improved by 20% or more, it can be said that there is a significant difference between the CTS in the welded joint obtained by unconventional welding and the CTS in the welded joint obtained by conventional welding.

Further, the number of iron-based carbides each having the length of the longest portion of 0.1 (μm) or more and existing in the above-described iron-based carbide number counting region of each spot-welded joint formed by performing the welding under the welding conditions represented in Tables 2 to 6, was counted by using a scanning electron microscope (SEM). A result thereof is represented in the section of number of precipitated iron-based carbide in Tables 7 and 8.

In order to obtain the above-described iron-based carbide number counting region, a target position of electrodes was set as a center of a welding mark. Further, the two pieces of steel plates were cut so as to pass through the center of the welding mark and to be along the plate thickness direction of the two pieces of steel plates, and the cross section was polished. The polished cross section was observed with the scanning electron microscope, to decide the above-described iron-based carbide number counting region. First, one of two positions separated by a length of 1/8 times a total plate thickness of the two pieces of steel plates before being subjected to the welding, in the plate thickness direction from a center of the spot-welded joint in the plate thickness direction, being a position at an end portion of a nugget of the polished cross section, was specified. A position separated from this position by 100 (μm) in a direction perpendicular to a tangent to a line indicating the end portion of the nugget (a line indicating a contour of the nugget) at the specified position, was specified from a region within a heat-affected zone of the polished cross section. Further, a square region, being a region in which the above position is set as its center, whose length of one side is 10 μwhich a plate thickness direction and a plate surface direction of the two pieces of steel plates are set to a vertical direction and a horizontal direction, respectively, was set to the above-described iron-based carbide number counting region. Further, a maximum value of a distance between arbitrary two points on a line indicating an end portion of iron-based carbide, was set to a longest portion.

In all of the welding processes, dome radius-type electrodes each made of copper and having a tip with a radius of curvature of 40 (mm), were used. The steel plates A, B, and C were subjected to welding at a pressurizing force of 5000 (N) by using electrodes each having a tip diameter of 8 (mm). The steel plates D and E were subjected to welding at a pressurizing force of 3500 (N) by using electrodes each having a tip diameter of 6 (mm). Note that the pressurizing force was set to be unchanged during the performance of pressurizing.

Further, when the spot welding was performed under the welding conditions of the numbers 2-1 to 2-20 represented in Tables 5 and 6 (the welding conditions including the performance of pre-energization), a gap was provided between the two pieces of steel plates, and the presence/absence of occurrence of expulsion during the performance of main welding was examined. A result of the examination is represented in the section of "presence/absence of expulsion when gap is provided" in Table 8. Two pieces of spacers each having a thickness of 2 (mm) were disposed, between the two pieces of steel plates, so as to face each other by being separated from each other, with a target position of electrodes arranged therebetween. An interval between each spacer and the target position of electrodes was set to 20 (mm).

TABLE 2

| NUMBER | STEEL PLATE | PRESSURIZING FORCE [N] | MAIN WELDING MAIN WELDING CURRENT [kA] | MAIN WELDING TIME [msec] | COOLING TIME AFTER MAIN WELDING [msec] |
|---|---|---|---|---|---|
| 1-1 | A | 5000 | 8.3 | 400 | 80 |
| 1-2 | A | 5000 | 8.3 | 400 | 180 |
| 1-3 | A | 5000 | 8.3 | 400 | 240 |
| 1-4 | A | 5000 | 8.3 | 400 | 80 |
| 1-5 | A | 5000 | 8.3 | 400 | 80 |
| 1-6 | A | 5000 | 8.3 | 400 | 180 |
| 1-7 | A | 5000 | 8.3 | 400 | 240 |
| 1-8 | A | 5000 | 8.3 | 400 | 240 |
| 1-9 | B | 5000 | 7.3 | 320 | 80 |
| 1-10 | B | 5000 | 7.3 | 320 | 120 |
| 1-11 | B | 5000 | 7.3 | 320 | 240 |
| 1-12 | B | 5000 | 7.3 | 320 | 80 |
| 1-13 | B | 5000 | 7.3 | 320 | 80 |

TABLE 2-continued

| | POST-ENERGIZATION | | | | | |
|---|---|---|---|---|---|---|
| NUMBER | POST-ENERGIZATION CURRENT [kA] | POST-ENERGIZATION TIME [msec] | RETENTION TIME [msec] | $48/(\alpha^2 - 0.44)$ | $tp > 48/(\alpha^2 - 0.44)$ | REMARKS |
| 1-1 | 7.5 | <u>100</u> | 100 | 127.5 | X | COMPARATIVE EXAMPLE |
| 1-2 | 7.5 | <u>100</u> | 100 | 127.5 | X | COMPARATIVE EXAMPLE |
| 1-3 | 7.5 | <u>100</u> | 100 | 127.5 | X | COMPARATIVE EXAMPLE |
| 1-4 | 7.5 | 200 | 100 | 127.5 | ○ | INVENTION EXAMPLE |
| 1-5 | 7.5 | 300 | 100 | 127.5 | ○ | INVENTION EXAMPLE |
| 1-6 | 7.5 | 300 | 100 | 127.5 | ○ | INVENTION EXAMPLE |
| 1-7 | 7.5 | 200 | 100 | 127.5 | ○ | INVENTION EXAMPLE |
| 1-8 | 7.5 | 300 | 100 | 127.5 | ○ | INVENTION EXAMPLE |
| 1-9 | 6.6 | <u>80</u> | 100 | 127.2 | X | COMPARATIVE EXAMPLE |
| 1-10 | 6.6 | <u>80</u> | 100 | 127.2 | X | COMPARATIVE EXAMPLE |
| 1-11 | 6.6 | <u>80</u> | 100 | 127.2 | X | COMPARATIVE EXAMPLE |
| 1-12 | 6.6 | 160 | 100 | 127.2 | ○ | INVENTION EXAMPLE |
| 1-13 | 6.6 | 400 | 100 | 127.2 | ○ | INVENTION EXAMPLE |

TABLE 3

| NUMBER | STEEL PLATE | PRESSURIZING FORCE [N] | MAIN WELDING CURRENT [kA] | MAIN WELDING TIME [msec] | COOLING TIME AFTER MAIN WELDING [msec] |
|---|---|---|---|---|---|
| 1-14 | B | 5000 | 7.3 | 320 | 120 |
| 1-15 | B | 5000 | 7.3 | 320 | 120 |
| 1-16 | B | 5000 | 7.3 | 320 | 180 |
| 1-17 | B | 5000 | 7.3 | 320 | 180 |
| 1-18 | B | 5000 | 7.3 | 320 | 240 |
| 1-19 | C | 5000 | 6.8 | 300 | 180 |
| 1-20 | C | 5000 | 6.8 | 300 | 40 |
| 1-21 | C | 5000 | 6.8 | 300 | 40 |
| 1-22 | C | 5000 | 6.8 | 300 | 80 |
| 1-23 | C | 5000 | 6.8 | 300 | 80 |
| 1-24 | C | 5000 | 6.8 | 300 | 120 |
| 1-25 | C | 5000 | 6.8 | 300 | 120 |
| 1-26 | C | 5000 | 6.8 | 300 | 180 |

| | POST-ENERGIZATION | | | | | |
|---|---|---|---|---|---|---|
| NUMBER | POST-ENERGIZATION CURRENT [kA] | POST-ENERGIZATION TIME [msec] | RETENTION TIME [msec] | $48/(\alpha^2 - 0.44)$ | $tp > 48/(\alpha^2 - 0.44)$ | REMARKS |
| 1-14 | 6.6 | 160 | 100 | 127.2 | ○ | INVENTION EXAMPLE |
| 1-15 | 6.6 | 400 | 100 | 127.2 | ○ | INVENTION EXAMPLE |
| 1-16 | 6.6 | 160 | 100 | 127.2 | ○ | INVENTION EXAMPLE |
| 1-17 | 6.6 | 400 | 100 | 127.2 | ○ | INVENTION EXAMPLE |
| 1-18 | 6.6 | 400 | 100 | 127.2 | ○ | INVENTION EXAMPLE |
| 1-19 | 6.2 | <u>80</u> | 100 | 127.7 | X | COMPARATIVE EXAMPLE |
| 1-20 | 6.2 | 160 | 100 | 127.7 | ○ | INVENTION EXAMPLE |
| 1-21 | 6.2 | 400 | 100 | 127.7 | ○ | INVENTION EXAMPLE |
| 1-22 | 6.2 | 160 | 100 | 127.7 | ○ | INVENTION EXAMPLE |
| 1-23 | 6.2 | 400 | 100 | 127.7 | ○ | INVENTION EXAMPLE |
| 1-24 | 6.2 | 160 | 100 | 127.7 | ○ | INVENTION EXAMPLE |
| 1-25 | 6.2 | 400 | 100 | 127.7 | ○ | INVENTION EXAMPLE |
| 1-26 | 6.2 | 160 | 100 | 127.7 | ○ | INVENTION EXAMPLE |

TABLE 4

| NUMBER | STEEL PLATE | PRESSURIZING FORCE [N] | MAIN WELDING CURRENT [kA] | MAIN WELDING TIME [msec] | COOLING TIME AFTER MAIN WELDING [msec] |
|---|---|---|---|---|---|
| 1-27 | C | 5000 | 6.8 | 300 | 180 |
| 1-28 | D | 3500 | 6.6 | 280 | 240 |
| 1-29 | D | 3500 | 6.6 | 280 | 240 |
| 1-30 | D | 3500 | 6.6 | 280 | — |
| 1-31 | D | 3500 | 6.6 | 280 | 40 |
| 1-32 | D | 3500 | 6.6 | 280 | 40 |
| 1-33 | D | 3500 | 6.6 | 280 | 40 |
| 1-34 | B | 3000 | 7.3 | 320 | 120 |
| 1-35 | B | 7000 | 7.3 | 320 | 120 |
| 1-36 | B | 5000 | 7.3 | 320 | 120 |
| 1-37 | B | 5000 | 7.3 | 320 | 120 |
| 1-38 | B | 5000 | 7.3 | 320 | 10 |
| 1-39 | B | 5000 | 7.3 | 320 | 350 |

| NUMBER | POST-ENERGIZATION CURRENT [kA] | POST-ENERGIZATION TIME [msec] | RETENTION TIME [msec] | $48/(\alpha^2 - 0.44)$ | $tp > 48/(\alpha^2 - 0.44)$ | REMARKS |
|---|---|---|---|---|---|---|
| 1-27 | 6.2 | 400 | 100 | 122.7 | ○ | INVENTION EXAMPLE |
| 1-28 | 6.2 | 160 | 100 | 108.5 | ○ | INVENTION EXAMPLE |
| 1-29 | 6.2 | 400 | 100 | 108.5 | ○ | INVENTION EXAMPLE |
| 1-30 | — | — | 100 | — | X | COMPARATIVE EXAMPLE |
| 1-31 | 6.2 | 800 | 100 | 108.5 | ○ | INVENTION EXAMPLE |
| 1-32 | 6.2 | 1000 | 100 | 108.5 | ○ | INVENTION EXAMPLE |
| 1-33 | 6.2 | 1400 | 100 | 108.5 | ○ | INVENTION EXAMPLE |
| 1-34 | 6.6 | 400 | 100 | 127.2 | ○ | COMPARATIVE EXAMPLE |
| 1-35 | 6.6 | 400 | 100 | 127.2 | ○ | COMPARATIVE EXAMPLE |
| 1-36 | 3.6 | 400 | 100 | −243.9 | ○ | COMPARATIVE EXAMPLE |
| 1-37 | 7.8 | 400 | 100 | 68.4 | ○ | COMPARATIVE EXAMPLE |
| 1-38 | 6.6 | 400 | 100 | 127.2 | ○ | COMPARATIVE EXAMPLE |
| 1-39 | 6.6 | 400 | 100 | 127.2 | ○ | COMPARATIVE EXAMPLE |

TABLE 5

| NUMBER | STEEL PLATE | PRESSURIZING FORCE [kN] | PRE-ENERGIZATION CURRENT [kA] | PRE-ENERGIZATION TIME [msec] | COOLING TIME AFTER PRE-ENERGIZATION [msec] | MAIN WELDING CURRENT [kA] | MAIN WELDING TIME [msec] | COOLING TIME AFTER MAIN WELDING [msec] |
|---|---|---|---|---|---|---|---|---|
| 2-1 | D | 3000 | 5.3 | 200 | 15 | 6.6 | 400 | 80 |
| 2-2 | D | 3000 | 5.3 | 150 | 20 | 6.6 | 400 | 180 |
| 2-3 | D | 3000 | 5.3 | 150 | 150 | 6.6 | 400 | 240 |
| 2-4 | D | 3000 | — | — | — | 6.6 | 400 | 80 |
| 2-5 | D | 3000 | 5.3 | 50 | 50 | 6.6 | 400 | 80 |
| 2-6 | D | 3000 | 5.3 | 100 | 50 | 6.6 | 400 | 180 |
| 2-7 | D | 3000 | 5.3 | 100 | 50 | 6.6 | 400 | 240 |
| 2-8 | D | 3000 | — | — | — | 6.6 | 400 | 240 |
| 2-9 | E | 3500 | 6.3 | 50 | 40 | 7.1 | 320 | 80 |
| 2-10 | E | 3500 | 6.3 | 50 | 40 | 7.1 | 320 | 120 |

| NUMBER | POST-ENERGIZATION CURRENT [kA] | POST-ENERGIZATION TIME [msec] | RETENTION TIME [msec] | $48/(\alpha^2 - 0.4)$ | $48/(\alpha^2 - 0.44)$ | $tp > 48/(\alpha^2 - 0.4)$ | $tp > 48/(\alpha^2 - 0.44)$ | REMARKS |
|---|---|---|---|---|---|---|---|---|
| 2-1 | 6.1 | 100 | 100 | 105.7 | 115.9 | X | X | COMPARATIVE EXAMPLE |
| 2-2 | 6.1 | 100 | 100 | 105.7 | 115.9 | X | X | COMPARATIVE EXAMPLE |
| 2-3 | 6.1 | 100 | 100 | 105.7 | 115.9 | X | X | COMPARATIVE EXAMPLE |
| 2-4 | 6.1 | 110 | 100 | 105.7 | 115.9 | ○ | X | COMPARATIVE EXAMPLE |
| 2-5 | 6.1 | 110 | 100 | 105.7 | 115.9 | ○ | X | INVENTION EXAMPLE |
| 2-6 | 6.1 | 300 | 100 | 105.7 | 115.9 | ○ | ○ | INVENTION EXAMPLE |
| 2-7 | 6.1 | 110 | 100 | 105.7 | 115.9 | ○ | X | INVENTION EXAMPLE |
| 2-8 | 6.1 | 110 | 100 | 105.7 | 115.9 | ○ | X | COMPARATIVE EXAMPLE |

TABLE 5-continued

| | | | | | | | | |
|---|---|---|---|---|---|---|---|---|
| 2-9 | 6.6 | 80 | 100 | 103.4 | 113.2 | X | X | COMPARATIVE EXAMPLE |
| 2-10 | 6.6 | 80 | 100 | 103.4 | 113.2 | X | X | COMPARATIVE EXAMPLE |

TABLE 6

| NUMBER | STEEL PLATE | PRESSURIZING FORCE [kN] | PRE-ENERGIZATION | | COOLING TIME AFTER PRE-ENERGIZATION [msec] | MAIN WELDING | | COOLING TIME AFTER MAIN WELDING [msec] |
|---|---|---|---|---|---|---|---|---|
| | | | PRE-ENERGIZATION CURRENT [kA] | PRE-ENERGIZATION TIME [msec] | | MAIN WELDING CURRENT [kA] | MAIN WELDING TIME [msec] | |
| 2-11 | E | 3500 | 6.3 | 50 | 20 | 7.1 | 320 | 240 |
| 2-12 | E | 3500 | 6.3 | 80 | 20 | 7.1 | 320 | 80 |
| 2-13 | E | 3500 | 6.3 | 80 | 20 | 7.1 | 320 | 80 |
| 2-14 | E | 3500 | 6.3 | 150 | 20 | 7.1 | 320 | 120 |
| 2-15 | E | 3500 | 6.3 | 15 | 20 | 7.1 | 320 | 120 |
| 2-16 | E | 3500 | 2.5 | 150 | 20 | 7.1 | 320 | 180 |
| 2-17 | E | 3500 | 6.3 | 150 | 250 | 7.1 | 320 | 180 |
| 2-18 | E | 3500 | 7.8 | 150 | 150 | 7.1 | 320 | 240 |
| 2-19 | E | 2000 | 6.3 | 80 | 20 | 7.1 | 320 | 80 |
| 2-20 | E | 6500 | 6.3 | 80 | 20 | 7.1 | 320 | 80 |

| NUMBER | POST-ENERGIZATION | | RETENTION TIME [msec] | 48/ ($\alpha^2$ − 0.4) | 48/ ($\alpha^2$ − 0.44) | $t_p > 48/$ ($\alpha^2$ − 0.4) | $t_p > 48/$ ($\alpha^2$ − 0.44) | REMARKS |
|---|---|---|---|---|---|---|---|---|
| | POST-ENERGIZATION CURRENT [kA] | POST-ENERGIZATION TIME [msec] | | | | | | |
| 2-11 | 6.6 | 80 | 100 | 103.4 | 113.2 | X | X | COMPARATIVE EXAMPLE |
| 2-12 | 6.6 | 160 | 100 | 103.4 | 113.2 | ○ | ○ | INVENTION EXAMPLE |
| 2-13 | 6.6 | 400 | 100 | 103.4 | 113.2 | ○ | ○ | INVENTION EXAMPLE |
| 2-14 | 7.8 | 160 | 100 | 59.5 | 62.6 | ○ | ○ | COMPARATIVE EXAMPLE |
| 2-15 | 6.6 | 400 | 100 | 103.4 | 113.2 | ○ | ○ | COMPARATIVE EXAMPLE |
| 2-16 | 6.6 | 160 | 100 | 103.4 | 113.2 | ○ | ○ | COMPARATIVE EXAMPLE |
| 2-17 | 6.6 | 400 | 100 | 103.4 | 113.2 | ○ | ○ | COMPARATIVE EXAMPLE |
| 2-18 | 6.6 | 400 | 100 | 103.4 | 113.2 | ○ | ○ | COMPARATIVE EXAMPLE |
| 2-19 | 6.6 | 160 | 100 | 103.4 | 113.2 | ○ | ○ | COMPARATIVE EXAMPLE |
| 2-20 | 6.6 | 160 | 100 | 103.4 | 113.2 | ○ | ○ | COMPARATIVE EXAMPLE |

TABLE 7

| NUMBER | CTS [kN] | STRENGTH RATIO TO JOINT OBTAINED BY CONVENTIONAL WELDING [%] | NUMBER OF PRECIPITATED IRON-BASED CARBIDE | REMARKS |
|---|---|---|---|---|
| 1-1 | 11.4 | 9 | 5 | COMPARATIVE EXAMPLE |
| 1-2 | 10.2 | −3 | 5 | COMPARATIVE EXAMPLE |
| 1-3 | 10.9 | 4 | 6 | COMPARATIVE EXAMPLE |
| 1-4 | 13.2 | 26 | 15 | INVENTION EXAMPLE |
| 1-5 | 13.2 | 25 | 30 | INVENTION EXAMPLE |
| 1-6 | 14.6 | 38 | 40 | INVENTION EXAMPLE |
| 1-7 | 14.6 | 39 | 35 | INVENTION EXAMPLE |
| 1-8 | 13.5 | 28 | 20 | INVENTION EXAMPLE |
| 1-9 | 7.7 | 16 | 7 | COMPARATIVE EXAMPLE |
| 1-10 | 7.8 | 16 | 7 | COMPARATIVE EXAMPLE |
| 1-11 | 6.2 | −7 | 3 | COMPARATIVE EXAMPLE |
| 1-12 | 11.3 | 69 | 30 | INVENTION EXAMPLE |
| 1-13 | 11.2 | 68 | 25 | INVENTION EXAMPLE |
| 1-14 | 9.4 | 41 | 40 | INVENTION EXAMPLE |
| 1-15 | 11.3 | 55 | 80 | INVENTION EXAMPLE |
| 1-16 | 8.1 | 36 | 25 | INVENTION EXAMPLE |
| 1-17 | 11.0 | 64 | 95 | INVENTION EXAMPLE |
| 1-18 | 10.5 | 57 | 48 | INVENTION EXAMPLE |
| 1-19 | 5.1 | −6 | 9 | COMPARATIVE EXAMPLE |
| 1-20 | 7.7 | 43 | 15 | INVENTION EXAMPLE |
| 1-21 | 8.8 | 64 | 70 | INVENTION EXAMPLE |
| 1-22 | 8.1 | 50 | 40 | INVENTION EXAMPLE |
| 1-23 | 8.7 | 61 | 87 | INVENTION EXAMPLE |
| 1-24 | 8.0 | 49 | 39 | INVENTION EXAMPLE |

TABLE 7-continued

| NUMBER | CTS [kN] | STRENGTH RATIO TO JOINT OBTAINED BY CONVENTIONAL WELDING [%] | NUMBER OF PRECIPITATED IRON-BASED CARBIDE | REMARKS |
|---|---|---|---|---|
| 1-25 | 8.9 | 65 | 120 | INVENTION EXAMPLE |
| 1-26 | 7.0 | 31 | 45 | INVENTION EXAMPLE |
| 1-27 | 8.5 | 58 | 197 | INVENTION EXAMPLE |
| 1-28 | 6.9 | 28 | 78 | INVENTION EXAMPLE |
| 1-29 | 9.1 | 68 | 28 | INVENTION EXAMPLE |
| 1-30 | 4.3 | 0 | <u>2</u> | COMPARATIVE EXAMPLE |
| 1-31 | 5.2 | 20 | 24 | INVENTION EXAMPLE |
| 1-32 | 5.4 | 25 | 35 | INVENTION EXAMPLE |
| 1-33 | 6.0 | 39 | 95 | INVENTION EXAMPLE |
| 1-34 | 4.2 | <u>−37</u> | <u>5</u> | COMPARATIVE EXAMPLE |
| 1-35 | 6.2 | <u>−7</u> | <u>4</u> | COMPARATIVE EXAMPLE |
| 1-36 | 4.8 | <u>−28</u> | <u>2</u> | COMPARATIVE EXAMPLE |
| 1-37 | 5.8 | <u>−13</u> | <u>2</u> | COMPARATIVE EXAMPLE |
| 1-38 | 6.9 | <u>4</u> | <u>8</u> | COMPARATIVE EXAMPLE |
| 1-39 | 6.1 | <u>−8</u> | <u>9</u> | COMPARATIVE EXAMPLE |

TABLE 8

| NUMBER | PRESENCE/ABSENCE OF EXPULSION WHEN GAP IS PROVIDED | CTS [kN] | STRENGTH RATIO TO JOINT OBTAINED BY CONVENTIONAL WELDING [%] | NUMBER OF PRECIPITATED IRON-BASED CARBIDE | REMARKS |
|---|---|---|---|---|---|
| 2-1 | ABSENCE | 4.3 | <u>8</u> | <u>2</u> | COMPARATIVE EXAMPLE |
| 2-2 | ABSENCE | 4.2 | <u>5</u> | <u>5</u> | COMPARATIVE EXAMPLE |
| 2-3 | ABSENCE | 4.1 | <u>2</u> | <u>4</u> | COMPARATIVE EXAMPLE |
| 2-4 | <u>PRESENCE</u> | 4.1 | <u>2</u> | <u>3</u> | COMPARATIVE EXAMPLE |
| 2-5 | ABSENCE | 5.2 | 30 | 18 | INVENTION EXAMPLE |
| 2-6 | ABSENCE | 5.1 | 28 | 15 | INVENTION EXAMPLE |
| 2-7 | ABSENCE | 5.6 | 40 | 21 | INVENTION EXAMPLE |
| 2-8 | <u>PRESENCE</u> | 4.3 | <u>8</u> | <u>2</u> | COMPARATIVE EXAMPLE |
| 2-9 | ABSENCE | 5.8 | <u>−3</u> | <u>0</u> | COMPARATIVE EXAMPLE |
| 2-10 | ABSENCE | 5.5 | <u>−8</u> | <u>5</u> | COMPARATIVE EXAMPLE |
| 2-11 | ABSENCE | 6.4 | <u>7</u> | <u>9</u> | COMPARATIVE EXAMPLE |
| 2-12 | ABSENCE | 7.2 | 20 | 25 | INVENTION EXAMPLE |
| 2-13 | ABSENCE | 8.1 | 35 | 14 | INVENTION EXAMPLE |
| 2-14 | ABSENCE | 6.1 | <u>2</u> | <u>2</u> | COMPARATIVE EXAMPLE |
| 2-15 | <u>PRESENCE</u> | 6.2 | <u>3</u> | <u>1</u> | COMPARATIVE EXAMPLE |
| 2-16 | <u>PRESENCE</u> | 6.6 | <u>10</u> | <u>7</u> | COMPARATIVE EXAMPLE |
| 2-17 | <u>PRESENCE</u> | 6.5 | <u>8</u> | <u>8</u> | COMPARATIVE EXAMPLE |
| 2-18 | <u>PRESENCE</u> | 6.4 | <u>7</u> | <u>4</u> | COMPARATIVE EXAMPLE |

As represented in Tables 7 and 8, in invention examples of the numbers 1-4 to 1-8, 1-12 to 1-18, 1-20 to 1-29, 1-31 to 1-33, 2-5 to 2-7, 2-12 and 2-13, the requirements defined in the above-described manner are satisfied (refer to Tables 7 and 8). Therefore, the welded joints each having a joint strength higher than the joint strength of the welded joint obtained by conventional spot welding (20% or more of the strength ratio to joint obtained by conventional welding) are obtained.

Note that when the P content in the steel plate exceeds 0.03 mass %, and when the S content in the steel plate exceeds 0.01 mass %, it was not possible to obtain 20% or more of the strength ratio to joint obtained by conventional welding, regardless of the welding conditions. Further, it was confirmed that the properties (tensile strength, workability, and the like) of the high-strength steel plate deteriorate when the carbon equivalent Ceq and the composition of the other components do not fall within the aforementioned ranges.

INDUSTRIAL APPLICABILITY

The present invention can be utilized in an industry which uses spot welding as a manufacturing technique, for example.

The invention claimed is:
1. A spot welding method of overlapping a plurality of pieces of steel plates and performing spot welding on the steel plates, wherein
at least one piece of steel plate out of the plurality of pieces of steel plates is a high-strength steel plate whose tensile strength is 750 MPa to 2500 MPa, wherein
a carbon equivalent Ceq of the high-strength steel plate represented by the following expression (A) is 0.20 mass% to 0.55 mass%,
the spot welding method comprising:
performing pre-energization of energizing welding electrodes with a pre-energization current $I_f$ (kA) satisfying the following expression (C) for a pre-energization time $t_f$ (msec) satisfying the following expression (D), in a state where the overlapped plurality of pieces of steel plates are pressurized by the welding electrodes at a pressurizing force $F_E$ (N) satisfying the following expression (B);

performing, after the pre-energization is finished, cooling after pre-energization of cooling the plurality of pieces of steel plates for a cooling time after pre-energization tc (msec) satisfying the following expression (E) while retaining the pressurizing force $F_E$ (N) satisfying the following expression (B);

performing, after the cooling after pre-energization is finished, main welding of energizing the welding electrodes with a main welding current $I_W$ (kA) while retaining the pressurizing force $F_E$ (N) satisfying the following expression (B);

performing, after the main welding is finished, cooling after main welding of cooling the plurality of pieces of steel plates for a cooling time after main welding $t_s$ (msec) satisfying the following expression (F) while retaining the pressurizing force $F_E$ (N) satisfying the following expression (B);

performing, after the cooling after main welding is finished, post-energization of energizing the welding electrodes with a post-energization current $I_P$ (kA) satisfying the following expression (G) for a post-energization time $t_P$ (msec) satisfying the following expression (H) while retaining the pressurizing force $F_E$ (N) satisfying the following expression (B); and retaining, after the post-energization is finished, the pressurizing force $F_E$ (N) satisfying the above expression (B) for a retention time $t_H$ (msec) satisfying the following expression (I), and then releasing the pressurizing at the pressurizing force $F_E$ (N), $$Ceq=[C]+[Si]/30+[Mn]/20+2[P]+4[S] \quad (A)$$

$$1960 \times h \le F_E \le 3920 \times h \quad (B)$$

$$0.40+I_W \le I_f < I_W \quad (C)$$

$$20 < t_f \quad (D)$$

$$0 \le t_C < 200+7 \times h \quad (E)$$

$$7 \times h+5 \le t_s \le 300 \quad (F)$$

$$0.66 \times I_W \le I_P < I_W \quad (G)$$

$$48/\{(I_P/I_W)^2-0.4\} \le t_P \quad (H)$$

$$0 \le t_H \le 300 \quad (I)$$

[C], [Si], [Mn], [P], and [S] in the above expression (A) indicate respective contents (mass%) of C, Si, Mn, P, and S, and h in the above expression (B), the above expression (E), and the above expression (F) indicates a plate thickness of the steel plate (mm).

* * * * *